(12) United States Patent
Manci et al.

(10) Patent No.: US 7,497,505 B2
(45) Date of Patent: Mar. 3, 2009

(54) SUSPENDED FLOORBOARD

(75) Inventors: Lewis H. Manci, New Bremen, OH (US); Brian M. Lambert, West Des Moines, IA (US); James F. Schloemer, New Bremen, OH (US); Gary J. May, Maria Stein, OH (US); William C. Jones, Jr., Greenville, OH (US); George R. Wetterer, Troy, OH (US); Eugene G. Bruns, Maria Stein, OH (US)

(73) Assignee: Crown Equipment Corporation, New Bremen, OH (US)

( * ) Notice: Subject to any disclaimer, the term of this patent is extended or adjusted under 35 U.S.C. 154(b) by 330 days.

(21) Appl. No.: 11/264,851

(22) Filed: Nov. 2, 2005

(65) Prior Publication Data

US 2006/0255622 A1 Nov. 16, 2006

Related U.S. Application Data

(60) Provisional application No. 60/676,233, filed on Apr. 29, 2005, provisional application No. 60/706,987, filed on Aug. 10, 2005.

(51) Int. Cl.
*B60R 27/00* (2006.01)

(52) U.S. Cl. .................................. 296/190.01; 248/638

(58) Field of Classification Search ............ 296/190.01; 180/210, 215, 216, 273, 315, 89.13; 303/19; 188/167; 74/512; 248/631, 638, 623, 624

See application file for complete search history.

(56) References Cited

U.S. PATENT DOCUMENTS

| | | | |
|---|---|---|---|
| 3,760,436 A | 9/1973 | Zach et al. |
| 3,774,711 A | 11/1973 | Lacey |
| 4,033,542 A | 7/1977 | Moehle et al. |
| 4,541,134 A | 9/1985 | Black et al. |

(Continued)

FOREIGN PATENT DOCUMENTS

| | | |
|---|---|---|
| GB | 1 440 686 | 6/1976 |
| JP | 59 032506 A | 2/1984 |

OTHER PUBLICATIONS

Crown specification brochure No. VFS-WP2300-01-GB Feb. 2004 entitled Crown WP 2300 Series Powered Pallet Truck, Germany.

(Continued)

*Primary Examiner*—Lori L Lyjak
(74) *Attorney, Agent, or Firm*—Stevens & Showalter LLP

(57) ABSTRACT

A materials handling vehicle is provided comprising: a frame; a set of wheels supported on the frame to allow the materials handling vehicle to move across a floor surface; a rider compartment located within the frame for receiving an operator; and an operator support assembly. The operator support assembly comprises a suspended floorboard upon which the operator may stand when located within the rider compartment and an energy absorbing structure coupled to the frame and the suspended floorboard for absorbing and dissipating at least a portion of energy resulting from disturbances encountered by the vehicle as it moves across the floor surface prior to the energy portion reaching the operator standing on the suspended floorboard, the energy absorbing structure including a damping element for effecting a damping function.

4 Claims, 17 Drawing Sheets

U.S. PATENT DOCUMENTS

| | | |
|---|---|---|
| 4,558,648 A | 12/1985 | Franklin et al. |
| 4,729,539 A | 3/1988 | Nagata |
| 4,764,075 A | 8/1988 | Cox et al. |
| 5,044,455 A | 9/1991 | Tecco et al. |
| 5,253,853 A | 10/1993 | Conaway et al. |
| 5,299,906 A | 4/1994 | Stone |
| 5,579,859 A | 12/1996 | Quellhorst et al. |
| 5,722,513 A | 3/1998 | Rowan et al. |
| 5,799,922 A | 9/1998 | Timms et al. |
| 6,137,398 A | 10/2000 | Dunlap et al. |
| 6,186,467 B1 | 2/2001 | Wahls |
| 6,419,203 B1 | 7/2002 | Dang |
| 6,467,581 B2 | 10/2002 | Bavendiek et al. |
| 6,550,740 B1 | 4/2003 | Burer |
| 6,603,728 B1 * | 8/2003 | Hopf et al. ............... 720/651 |
| 6,719,258 B2 | 4/2004 | Bryngelson et al. |
| 6,776,384 B2 | 8/2004 | Igarashi |
| 6,866,236 B2 | 3/2005 | Mullinix et al. |
| 6,935,693 B2 | 8/2005 | Janscha et al. |
| 2004/0124037 A1 | 7/2004 | Ruck |
| 2004/0144906 A1 | 7/2004 | Hill et al. |
| 2005/0073184 A1 | 4/2005 | Tsuji et al. |

OTHER PUBLICATIONS

Crown specification brochure No. VFS-WP-03-GB Mar. 2002 entitled Crown Series WP 2000 Pedestrian Pallet Truck, Germany.

Crown advertisement brochure No. BROCH GB May 2006; 30-M01383-006-02 entitled WD 2300S Series, Germany.

De Man, P.; Lemerle, P; Mistrot, P; Verschueren, J-PH; Preumont, A; ingentaconnect: An Investigation of a semiactive suspension for a fork lift truck, Vehicle System Dynamics, vol. 43, No. 2, Feb. 2005, pp. 107-119.

Still SV 12 Technical Data brochure for Stand-on high lift pallet truck (Mar. 2004).

Still SD 20 Technical Data brochure for Stand-on double decker high lift pallet truck.

News article featuring Challenger's MT865B and MT875B tractors in IVT International, Sep. 2005.

Still SV 12 Technical Data brochure for Stand-on high lift pallet truck.

* cited by examiner

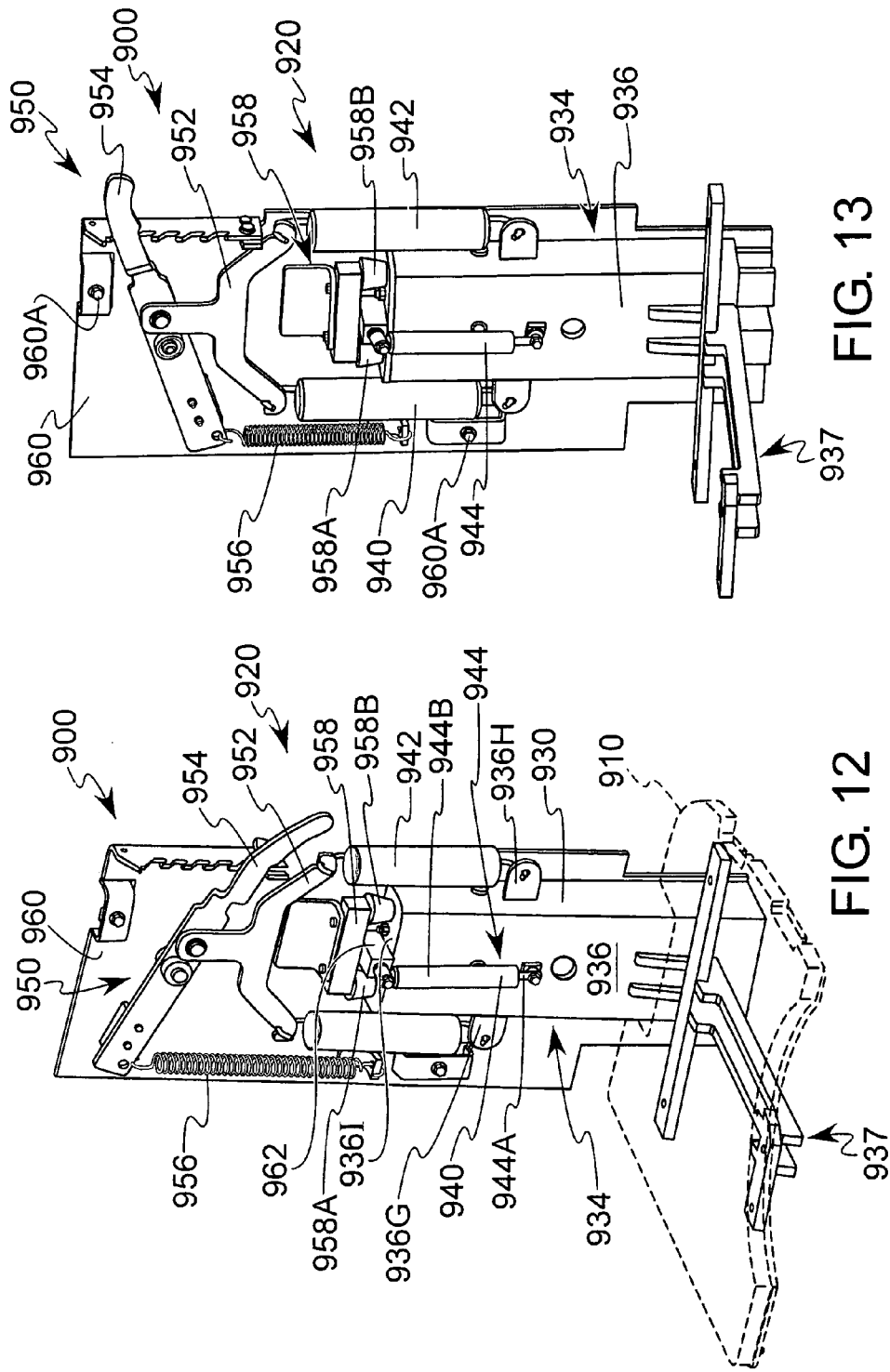

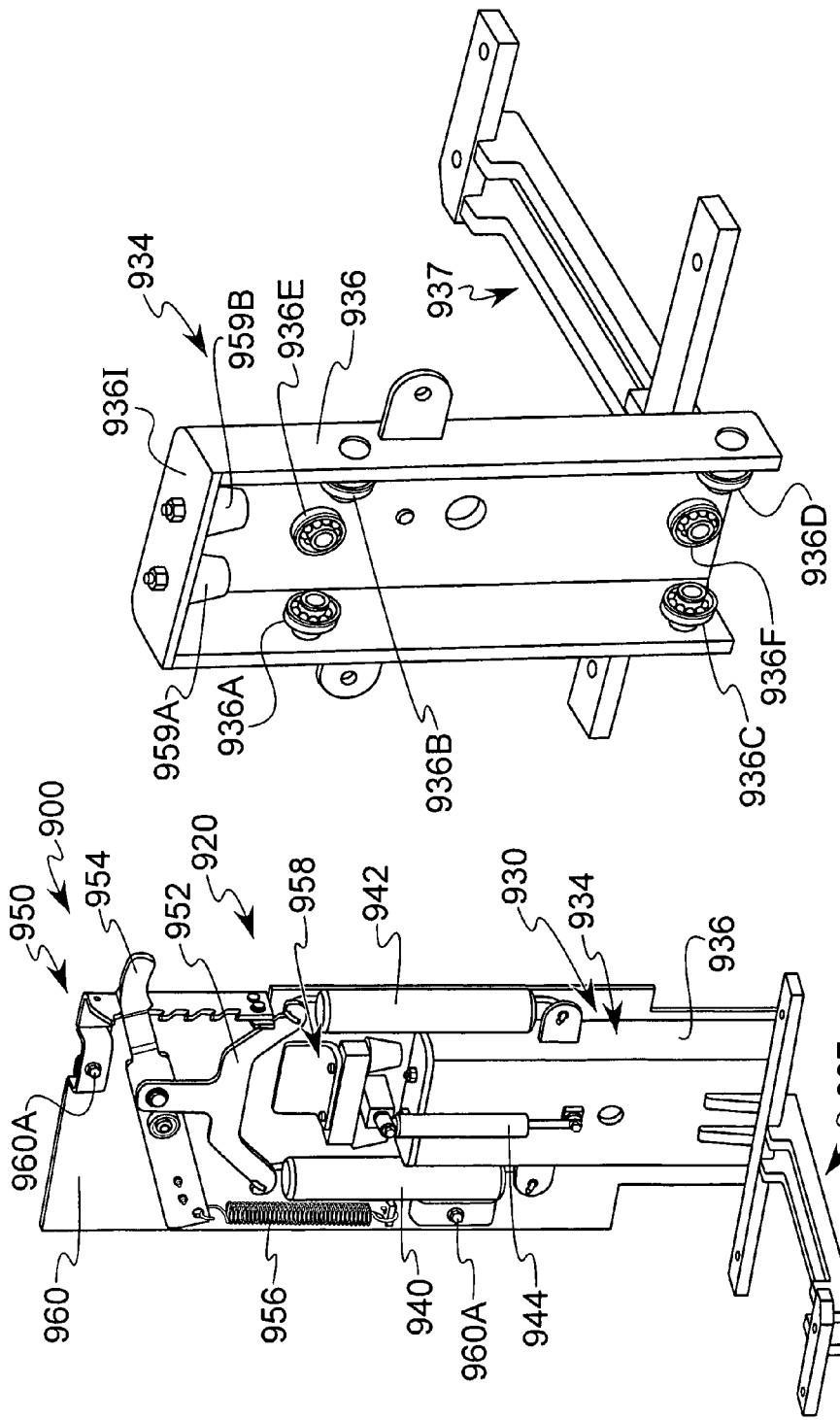

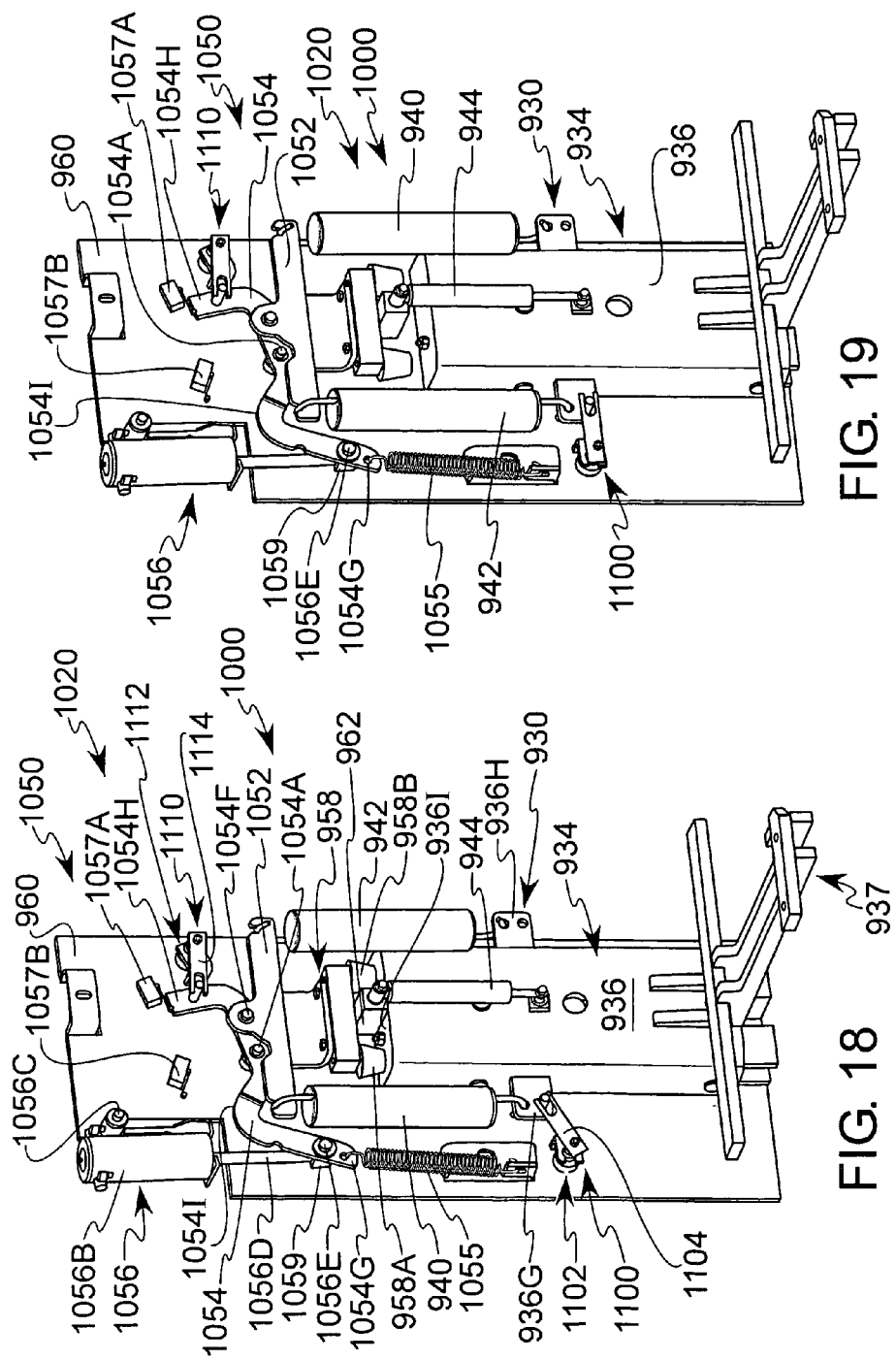

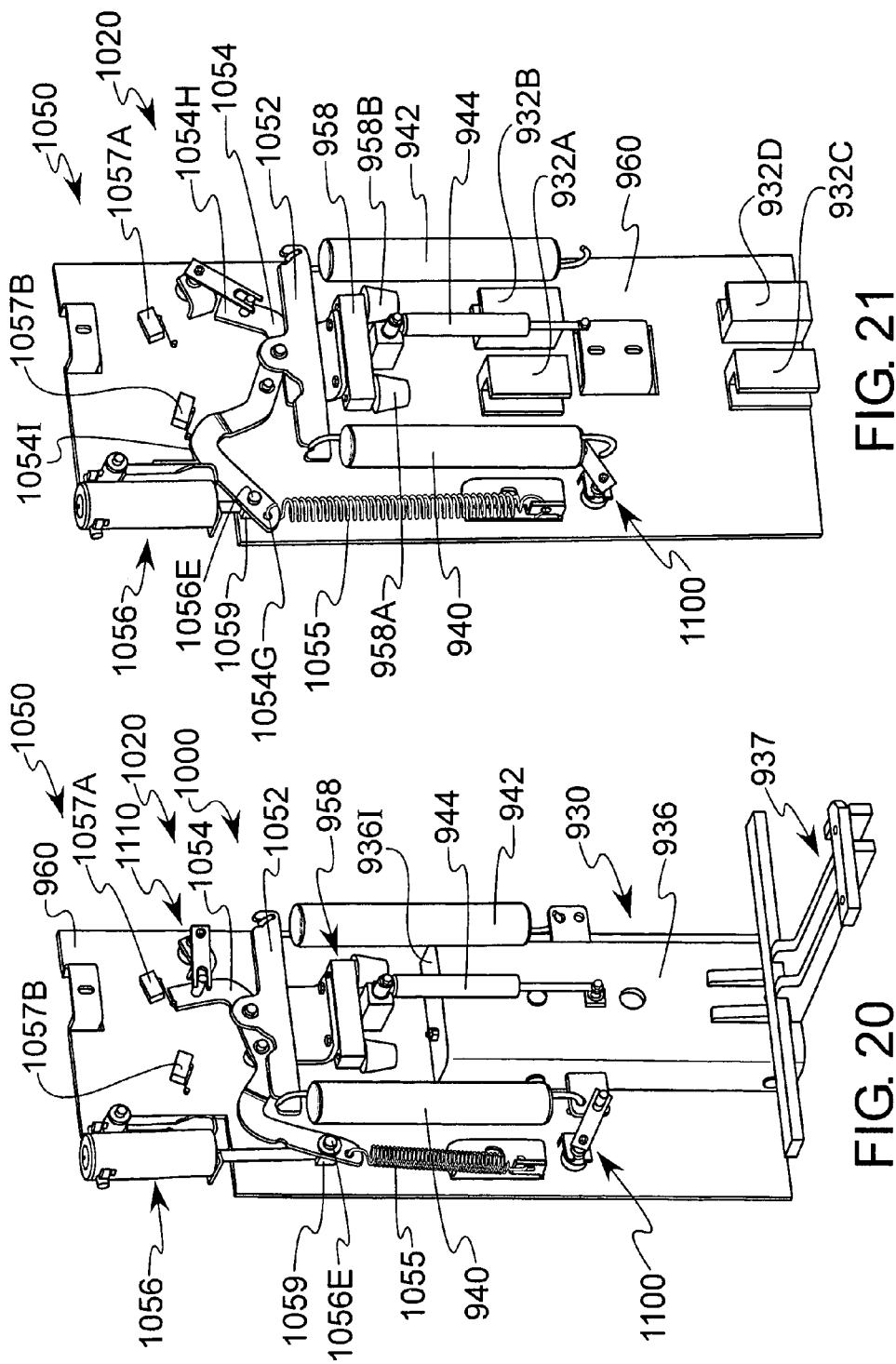

SUSPENDED FLOORBOARD

This application claims the benefit of U.S. Provisional application No. 60/676,233, filed Apr. 29, 2005 and entitled "Suspended Floorboard," and U.S. Provisional application No. 60/706,987, filed Aug. 10, 2005, entitled "Suspended Floorboard," the disclosures of which are incorporated herein by reference.

BACKGROUND OF THE INVENTION

The present invention relates to a materials handling vehicle, such as a lift truck. More particularly, the present invention relates to a materials handling vehicle having an operator support assembly for absorbing and dissipating energy resulting from disturbances encountered by the vehicle during movement across a floor surface so as to isolate the operator from that energy. While the present invention may be utilized on a variety of materials handling vehicles, it will be described herein with reference to a counterbalanced lift truck for which it is particularly applicable and initially being used.

It is known in the prior art to provide a fork lift truck with a floorboard fixedly mounted to a frame of the truck. A rubber mat, upon which an operator stands, is provided over the floorboard for absorbing a portion of energy resulting from disturbances encountered by the vehicle during movement across a floor surface.

It is also known in the prior art to provide a fork lift truck with a floorboard supported on a plurality, e.g., four, stiff rubber supports. The floorboard is mounted to the truck frame via the rubber supports. The rubber supports absorb a portion of the energy resulting from disturbances encountered by the truck during movement across a floor surface.

U.S. Pat. No. 5,579,859 discloses a fork lift truck having a floorboard pivotably supported to the vehicle frame. A plurality of compression springs are provided beneath the floorboard and function to absorb a portion of energy resulting from disturbances encountered by the vehicle during movement across a floor surface.

It is desirable to have operator support assemblies for absorbing energy resulting from disturbances encountered by a materials handling vehicle during movement of the vehicle across a floor surface so as to isolate the operator from that energy.

BRIEF SUMMARY OF THE INVENTION

In accordance with the present invention, embodiments of an operator support assembly for use in a materials handling vehicle are provided. Each operator support assembly may comprise a suspended floorboard upon which an operator stands when located within a rider compartment of the vehicle. An energy absorbing structure is coupled to a frame of the vehicle and the suspended floorboard for absorbing and dissipating at least a portion of energy resulting from disturbances encountered by the vehicle as it moves across a floor surface. In this way, the energy portion does not reach the operator standing on the suspended floorboard.

Standing on a suspended floorboard may include an operator standing freely on the floorboard without contacting any other surface on the truck except for gripping a control knob, lever or the like, or standing on the suspended floorboard while contacting a backrest surface, an armrest, a perch or other supporting surface within an operator compartment.

In accordance with a first aspect of the present invention, a materials handling vehicle comprises a frame and a set of wheels supported on the frame to allow the materials handling vehicle to move across a floor surface. An operator support assembly is provided comprising a suspended floorboard and an energy absorbing structure coupled to the frame and the suspended floorboard for absorbing and dissipating at least a portion of energy resulting from disturbances encountered by the vehicle as it moves across the floor surface prior to the energy portion reaching the operator standing on the suspended floorboard. The energy absorbing structure preferably includes a damping element for effecting a damping function.

The operator support assembly may also include one or more of a backrest, an armrest, a control knob or lever such as a multifunction controller or steering tiller or other elements typically found within an operator's compartment coupled to and suspended with the floorboard. Hence, the backrest, armrest, control knob or lever, or like elements may move with the floorboard and an operator standing on the floorboard.

The damping element may comprise at least one damper. The damper may be at least partially filled with a liquid, such as a hydraulic fluid or oil. The energy absorbing structure may further comprise at least one spring for receiving and storing energy.

The energy absorbing structure may further comprise a mast assembly coupled to the frame and the floorboard for permitting movement of the suspended floorboard relative to the frame. The mast assembly may comprise a first element coupled to the frame and a second element forming a carriage assembly for vertical movement relative to the first element. The carriage assembly may include a floorboard support adapted to receive the floorboard. The first element may comprise a channel such that the carriage assembly moves within the channel. The carriage assembly may further comprise front and side load bearings mounted on a main body, with the floorboard support being fixed to the main body for movement with the main body relative to the channel.

The energy absorbing structure may further comprise structure coupled between the frame and the at least one spring for varying a preload on the at least one spring. The structure coupled between the frame and the at least one spring for varying a preload on the at least one spring may comprise a motor provided with a screw or a lever capable of being manually moved by an operator. In accordance with one embodiment, the at least one spring may be vertically positioned and coupled between the structure and the floorboard, and the at least one damper may be vertically positioned and coupled between the frame and the floorboard.

In place of the mast assembly, the energy absorbing structure may further comprise a scissors mechanism positioned between the floorboard and a base of the frame. The scissors mechanism may comprise a pair of first and second scissor arms and a pair of third and fourth scissor arms. The first scissor arm may be pivotably coupled at a first end to the base of the frame and have a second end in engagement with the floorboard. The second scissor arm may be pivotably coupled at a first end to the floorboard and have a second end in engagement with the base of the frame. The third scissor arm may be pivotably coupled at a first end to the base of the frame and have a second end in engagement with the floorboard. The fourth scissor arm may be pivotably coupled at a first end to the floorboard and have a second end in engagement with the base of the frame.

The at least one spring may be generally vertically positioned and coupled between the frame and the scissors mechanism or floorboard, and the at least one damper may be generally vertically positioned and coupled between the frame and the scissors mechanism or floorboard.

Alternatively, the at least one spring may be generally horizontally positioned and coupled between the frame and the scissors mechanism, and the at least one damper may be generally horizontally positioned and coupled between the frame and the scissors mechanism.

In accordance with further embodiments of the present invention, the damping element may comprise a valve. The energy absorbing structure may further comprise a hydraulic piston/cylinder unit coupled to the frame, and a ride accumulator capable of receiving and storing energy. The valve may be positioned between the piston/cylinder unit and the ride accumulator.

The energy absorbing structure may further comprise a mast assembly coupled to the hydraulic piston/cylinder unit, the frame and the floorboard for permitting movement of the suspended floorboard relative to the frame.

In one embodiment, the valve comprises a mechanical valve, such as a needle valve. The energy absorbing structure may further comprise a processor-controlled valve capable of allowing pressurized fluid to pass to the hydraulic piston/cylinder unit and the ride accumulator.

In another embodiment, the valve may comprise a first processor-controlled valve. In this embodiment, the energy absorbing structure may further comprise a second processor-controlled valve, a height adjust accumulator, a third processor-controlled valve and a processor for controlling the first, second and third valves.

The processor may cause the first valve to be in a first position such that the first valve is closed when an operator enters or exits a rider compartment. The processor may move the first valve to a second position when the vehicle is in motion so as to open the first valve to allow the floorboard to move relative to the frame.

The processor may effect a floorboard height adjustment operation when the floorboard is spaced from a neutral position after an operator has stepped onto the floorboard.

The processor may move the second valve to a closed state when a floorboard height adjustment operation is not being effected. The processor may also move the second valve to an open state so as to allow pressurized air within the ride accumulator to be released when the floorboard is to be lowered to the neutral position.

The processor may move the third valve to a second position so as to allow pressurized fluid to enter the height adjust accumulator and subsequently move the second valve to its open state when the floorboard is to be raised to the neutral position.

All embodiments may include upper and lower endstops to confine floorboard movement between upper and lower stop positions. The endstops may be generally elastic in nature and made of natural rubber, urethane or silicone type materials, and designed with linear or non-linear spring rates and damping characteristics to optimize ride comfort when the floorboard is in contact with the endstops.

BRIEF DESCRIPTION OF THE SEVERAL VIEWS OF THE DRAWINGS

FIG. 12 is a perspective view of an operator support assembly constructed in accordance with a ninth embodiment of the present invention with a lever forming part of a preload adjusting structure positioned in its lowermost position;

FIG. 13 is a perspective view of the operator support assembly of FIG. 12 with the lever positioned in its uppermost position;

FIG. 14 is a perspective view of the operator support assembly of FIG. 12 where a carriage assembly is shown spaced from first and second upper stops;

FIG. 15 is a perspective view of the carriage assembly of the operator support assembly of FIG. 12;

FIG. 18 is a perspective view of an operator support assembly constructed in accordance with a tenth embodiment of the present invention where a carriage assembly is shown in an uppermost position;

FIG. 19 is a perspective view of the operator support assembly of FIG. 18 where the carriage assembly is shown in an intermediate position;

FIG. 20 is a perspective view of an operator support assembly of FIG. 18 where the carriage assembly is shown in a lowermost position;

FIG. 21 is a perspective view of an operator support assembly of FIG. 18 where the carriage assembly has been removed and a lever of a preload adjusting structure is shown engaging a second limit switch.

DETAILED DESCRIPTION OF THE INVENTION

Figure 1:
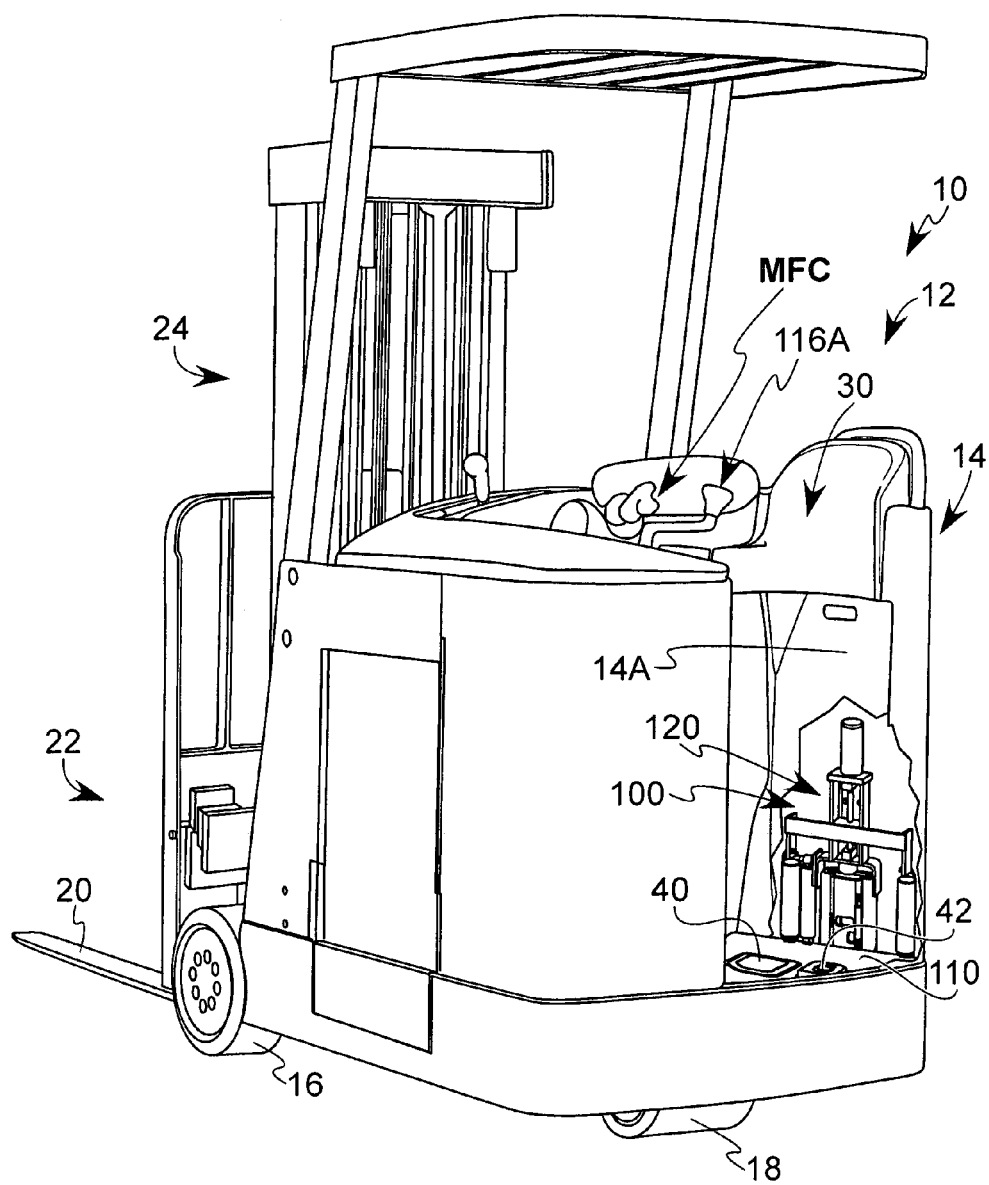
FIG. 1 is a perspective view of a fork lift truck including an operator support assembly constructed in accordance with a first embodiment of the present invention.

Reference is now made to FIG. 1, which is a perspective view of a three-wheel stand-up counterbalanced fork lift truck 10. An operator support assembly 100, constructed in accordance with a first embodiment of the present invention, is incorporated into the truck 10. While the present invention is described herein with reference to the stand-up counterbalanced truck 10, it will be apparent to those skilled in the art that the invention and variations of the invention can be more generally applied to a variety of other materials handling vehicles.

The fork lift truck 10 further includes a main body 12 comprising a frame 14, first and second driven wheels coupled to a front portion of the frame 14, only the first wheel 16 is illustrated in FIG. 1, and a third steerable wheel 18 coupled to a rear portion of the frame 14. The first, second and third wheels 16 and 18 allow the truck 10 to move across a floor surface. The speed and direction of movement (forward or reverse) of the truck 10 can be controlled via a multifunction controller MFC. Steering is effected via a tiller 116A.

A set of forks 20 are coupled to a fork carriage 22, which, in turn, is coupled to a fork carriage mast assembly 24 for raising/lowering the fork carriage 22 relative to the main body 12. Movement of the fork carriage 22 is effected using conventional controls.

A rider compartment 30 is located within the main body frame 14 for receiving an operator. A suspended floorboard 110 forming part of the operator support assembly 100, see FIGS. 1 and 2, defines a floor in the rider compartment 30. When an operator is standing in the rider compartment 30, a first foot of the operator engages, i.e., pushes downward on, an operator presence sensor 40. When not depressed, the presence sensor 40 extends upward through a first opening 110A in the floorboard 110, see FIG. 2. The sensor 40 must be activated, i.e., depressed, to permit operation of the truck 10.

A brake pedal 42 extends through a second opening 110B in the floorboard 110. To release braking action, the brake pedal 42 is held down by the operator's second foot. To request braking, the operator removes or reduces a downward force on the brake pedal 42 such that the brake pedal 42 moves vertically upward.

Referring again to FIG. 2, the operator support assembly 100 further comprises an energy absorbing structure 120 coupled to the truck main body frame 14 and the suspended floorboard 110 for absorbing and dissipating at least a portion of energy resulting from disturbances encountered by the truck 10 as it moves across a floor surface prior to the energy portion reaching the operator standing on the suspended floorboard 110. The disturbances may result from the truck 10 passing over a continuously uneven surface, or moving over large bumps or sharp drops in the surface. In the embodiment illustrated in FIGS. 1 and 2, the energy absorbing structure 120 comprises a mast assembly 130, first and second tension springs 140 and 142, a damper 144, and spring preload adjusting structure 150.

Figure 3:
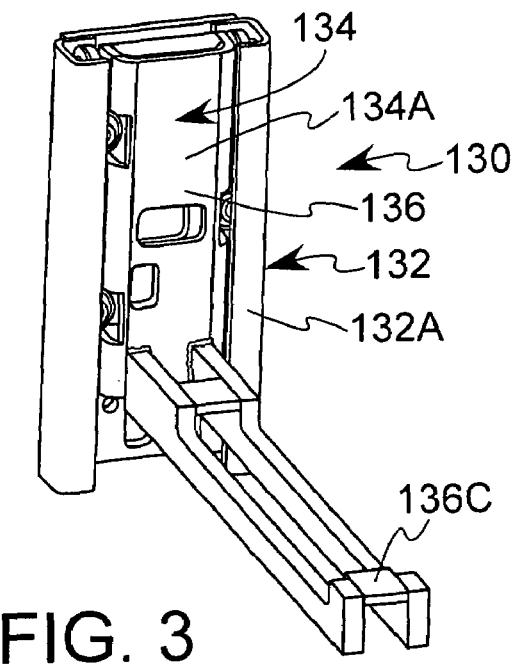
FIG. 3 is a perspective view of a mast assembly forming part of the operator support assembly illustrated in FIG. 2.
Figure 4:
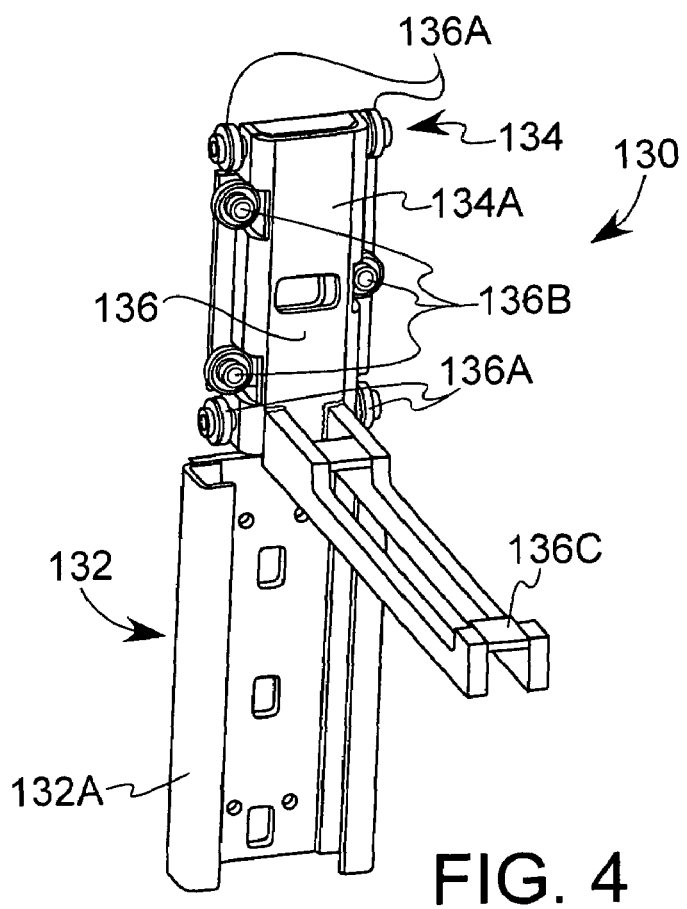
FIG. 4 is an exploded view of the mast assembly illustrated in FIG. 3.

Referring now to FIGS. 3 and 4, the mast assembly 130 includes a first element 132, a channel 132A in the illustrated embodiment, which is fixedly coupled, such as by welds, to the frame 14 of the truck main body 12. The mast assembly 130 further comprises a second element 134, a carriage assembly 134A in the illustrated embodiment, capable of vertical movement within the channel 132A. The carriage assembly 134A comprises a main body 136 having front load bearings 136A and side load bearings 136B, which allow the main body 136 to move vertically within the channel 132A, see FIGS. 3 and 4. The carriage assembly 134A further comprises a floorboard support 136C, which is fixedly coupled, such as by welds, to the main body 136 for movement with the main body 136. The floorboard support 136C is positioned beneath the floorboard 110 and supports the floorboard 110 within the rider compartment 30. The floorboard support 136C functions as the sole support for the floorboard 110; hence, the floorboard 110 is suspended in the rider compartment 30 on the support 136C and moves vertically with the floorboard support 136C and the main body 136. Preferably, the floorboard 110 is fixedly coupled to the support 136C.

Figure 2:
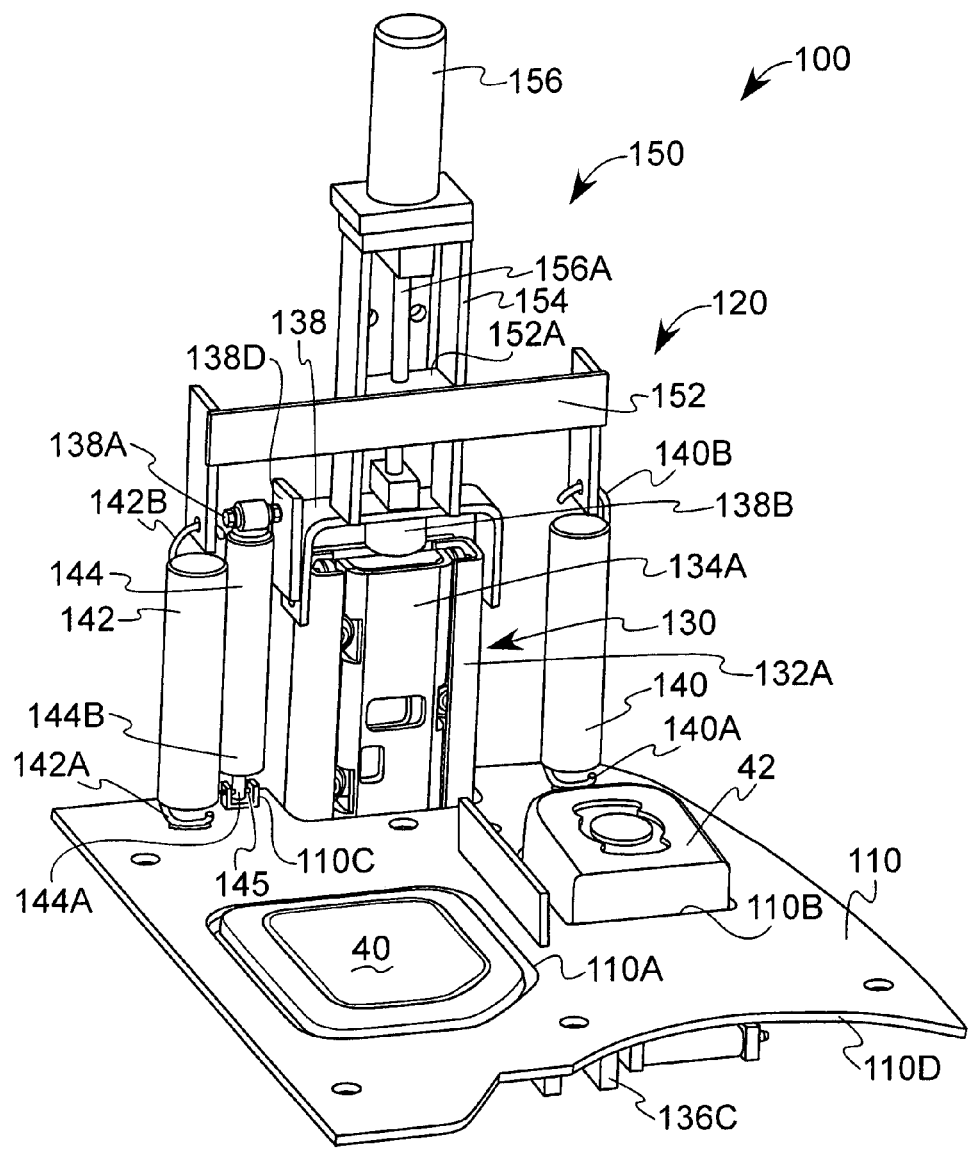
FIG. 2 is a perspective view of the operator support assembly illustrated in FIG. 1.

As illustrated in FIG. 2, the first and second tension springs 140 and 142 are weldably coupled at first ends 140A and 142A to the floorboard 110 and releasably coupled at second ends 140B and 142B to a movable adjustment bracket 152 forming part of the preload adjusting structure 150. It is also contemplated that the spring first ends 140A and 142A may be releasably coupled to the floorboard 110 such as by extending through openings (not shown) in the floorboard 110.

The damper 144 may comprise a piston rod 144A coupled via a pin 145 to a bracket 110C fixedly coupled to the floorboard 110. A cylinder 144B of the damper 144 is coupled to a U-shaped bracket 138 via a bolt 138A and coupling plate 138D. The U-shaped bracket 138 is fixed to the channel 132A, which, as noted above, is fixed to the truck main body frame 14. The cylinder 144B may contain a piston/valve assembly (not shown) coupled to the piston rod 144A for movement with the piston rod 144A and a separator piston (not shown) free floating within the cylinder 144B. A fluid such as oil is provided on both sides of the piston/valve assembly, while the separator piston is exposed to the oil on one side and exposed to a gas, e.g., air, on its other side. In the illustrated embodiment, the damper 144 generates damping action that is different for compression and extension. The damper 144 generates the damping action by creating a differential pressure across the piston/valve assembly that is proportional to the damping force. The rate of fluid flow through compression and extension orifices in the piston/valve assembly is proportional to the compression and extension velocities. When the piston rod 144A moves inward (compression), which occurs when the springs 140, 142 retract for a hole, as discussed below, a quantity of fluid corresponding to the differential volume created is pushed through a compression orifice in the piston/valve assembly in a first direction to an opposing side of the piston of the piston/valve assembly. When the piston rod 144A moves out (extension), which occurs when the springs 140, 142 extend for a bump, as discussed below, a quantity of fluid moves through an extension orifice in the piston/valve assembly in a second direction opposite to the first direction to an opposing side of the piston of the piston/valve assembly. Check type valves are used in the compression and extension orifices to direct the fluid through the appropriate orifice and in the appropriate direction. The compression and extension orifices are different in size to provide different damping characteristics in compression and extension. The damper 144 may comprise a damper commercially available from Stabilus (Germany) under the product designation Stab-O-Shoc. From mathematical calculations, it is believed that the damper 144 should have a linear damping rate of 4-10 pounds-second/inch for compression, 10-20 pounds-second/inch for extension, and a stroke length between about 1 inch to about 5 inches and preferably about 2 inches. Other damping characteristics such as variable damping characteristics could be used to provide other desirable damper responses.

The springs 140 and 142 function to absorb at least a portion of energy resulting from disturbances encountered by the truck 10 as it moves along a floor surface. The springs 140 and 142 extend (for a bump) and retract (for a hole) in response to receiving kinetic energy and, as such, store the kinetic energy as potential energy. The damper 144 functions to absorb the energy released from the springs 140 and 142 as the springs 140 and 142 return to an initial position following extension or retraction, i.e., the damper 144 converts the kinetic energy into heat. The damper 144 further performs a damping function as the springs 140 and 142 are extended or retracted. By absorbing and dissipating the energy resulting from disturbances encountered by the truck 10, the springs 140 and 142 and the damper 144 function to substantially reduce impact and vibration energy from reaching the operator standing on the floorboard 110.

A mounting bracket 154, also forming part of the preload adjusting structure 150, is fixed to the U-shaped bracket 138. The mounting bracket 154 supports a motor 156, which functions to turn a screw 156A. The screw 156A passes through a threaded bore in a back plate 152A of the movable bracket 152. By actuating the motor 156 to rotate the screw 156A in either a first rotational direction or a second rotational direction opposite to the first direction, the movable bracket 152 is caused to move vertically away from or toward the U-shaped bracket 138. When the bracket 152 moves away from the bracket 138 and toward the motor 156, the first and second springs 140 and 142 are extended, i.e., lengthened, so as to increase a preload on each spring 140, 142. When the bracket 152 is moved in a direction toward the bracket 138 and away from the motor 156, the preload on the springs 140 and 142 is reduced.

An upper stop 138B is fixedly coupled to the U-shaped bracket 138 so as to limit upward movement of the carriage assembly 134A. One or more lower stops (not shown) are fixed to a lower surface 110D of the floorboard 110 to limit downward movement of the floorboard 110 relative to a base (not shown in FIGS. 1 and 2) of the frame 14, i.e., the lower stops engage the base of the truck main body frame 14 to prevent further downward movement of the floorboard 10 and the carriage assembly 134A. The upper and lower stops are generally elastic in nature and designed to minimize shock transmission while the floorboard 110 is in contact with the stops. The upper and lower stops may be made of natural rubber, urethane, silicone or other like elastomeric type material. The stops in a preferred embodiment provide a force deflection characteristic, i.e., they deflect by x amount when a force F is applied against the stop, as described by the following polynomial equation:

$$F = -27.88x^3 + 251x^2 + 86.7x$$

wherein F=force, and x=deflection.

Preferably, the position of the floorboard 110 is located in a neutral position between an upper stop position where the carriage assembly 134A engages the upper stop 138B and a lower stop position where the lower stops on the floorboard 110 engage the base of the frame 14. In the illustrated embodiment, the "neutral position" is equal to a predefined position falling within a range equal to ±15% of a centered position. That is, the neutral position is a predefined position which may comprise a midway position between the upper and lower stop positions or may be defined by another position falling within the range of ±15% of the midway or centered position. The maximum distance that the floorboard 110 moves between its upper and lower stop positions may be from about 1 inch to about 5 inches and preferably is about 2 inches.

When a light-weight operator is positioned on the floorboard 110, the floorboard 110 may be spaced from the neutral position toward the upper stop 138B. Conversely, when a heavy-weight operator is positioned on the floorboard 110, the floorboard 110 may be spaced from the neutral position toward the base of the frame 14. So as to allow the floorboard 110 to be located at the neutral position subsequent to an operator stepping onto the floorboard 110, the motor 156 is driven to cause the screw 156A to rotate in an appropriate direction to vary the preload on the springs 140 and 142 such that the floorboard 110 is repositioned to its neutral position.

It is contemplated that switches (not shown) or other position sensing type devices may be provided to sense during a floorboard height adjustment operation when the floorboard 110 is away from its neutral position such that appropriate signals are generated by the switches to a processor which causes the motor 156 to drive the screw 156A in an appropriate direction to effect movement of the floorboard 110 to its neutral position. It is contemplated that the processor may effect a floorboard height adjustment operation so as to move the floorboard to its neutral position just after an operator enters the operator's compartment 30 and activates the presence sensor 40. Alternatively, an operator may manually actuate one or more switches (not shown) to drive the motor 156 in an appropriate direction so as to cause the floorboard 110 to be moved to a neutral position, which position may be indicated visually to the operator when the floorboard 110 is aligned with an alignment mark (not shown) provided on a wall of the frame 14. It is believed that the floorboard 110 may accommodate an operator having a weight that falls within a substantially broad range, e.g., from about 100 pounds to about 300 pounds, and yet still be located in the neutral position by varying the preload on the springs 140 and 142.

It is preferred that the operator support assembly 100 have a natural frequency between about 1.5 and about 2.5 Hz. It is further preferred that the floorboard 110 typically move only within a range of positions well within its upper and lower stop positions during normal operation of the truck 10. It is believed that the energy absorbing structure 120 coupled to the floorboard 110 supporting an operator having a weight between about 100 pounds and 300 pounds and capable of achieving these two objectives may comprise first and second springs 240 and 242 having a relaxed length (prior to being coupled to the floorboard 110 and the movable adjustment bracket 152) of from about 6 inches to about 12 inches, and a spring rate of from about 25 pounds/inch to about 200 pounds/inch.

It is noted that the energy absorbing structure 120 is small in size so as to allow the structure 120 to be easily housed or located behind a rider compartment interior wall 14A of the main body frame 14, see FIG. 1, where the wall 14A is broken away to allow the structure 120 to be seen. Similarly, the floorboard support 136C is relatively small in size so as to allow it to be easily positioned between the floorboard 110 and the base of the frame 14.

It is believed that the operator support assembly 100 is advantageous as it minimizes shock and vibration transmission to an operator; reduces vehicle ride harshness; allows for significant operator weight range, e.g., 100 pounds to 300 pounds; provides an acceptable ride quality, i.e., softness, during vehicle operation; maintains an acceptable firmness when an operator enters and exits the vehicle; and may be manufactured at an acceptable cost.

Figure 5:
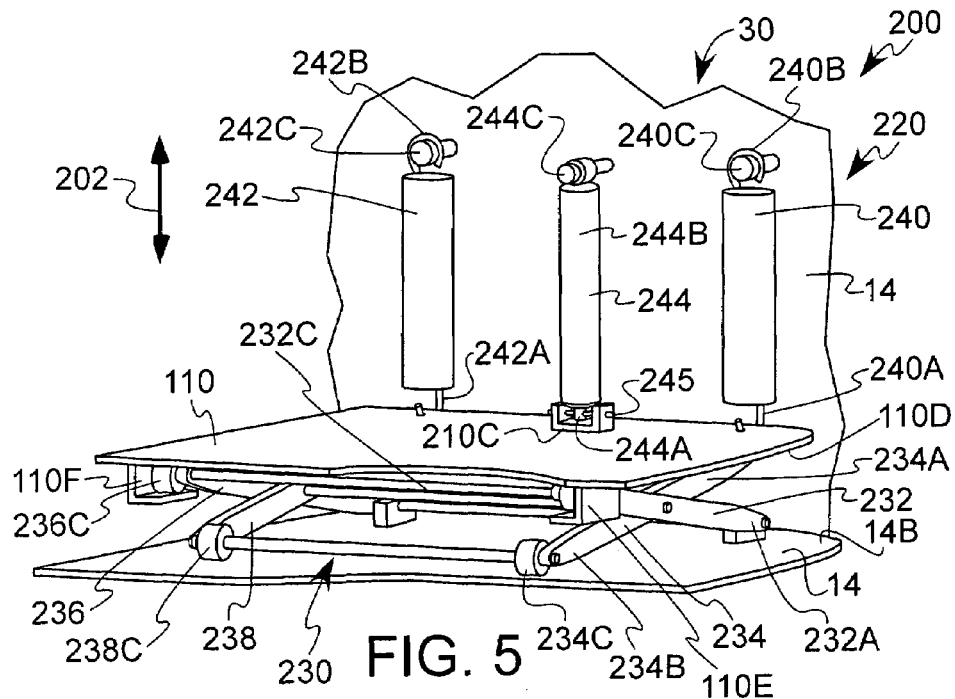
FIG. 5 is a perspective view of an operator support assembly constructed in accordance with a second embodiment of the present invention.
Figure 5A:
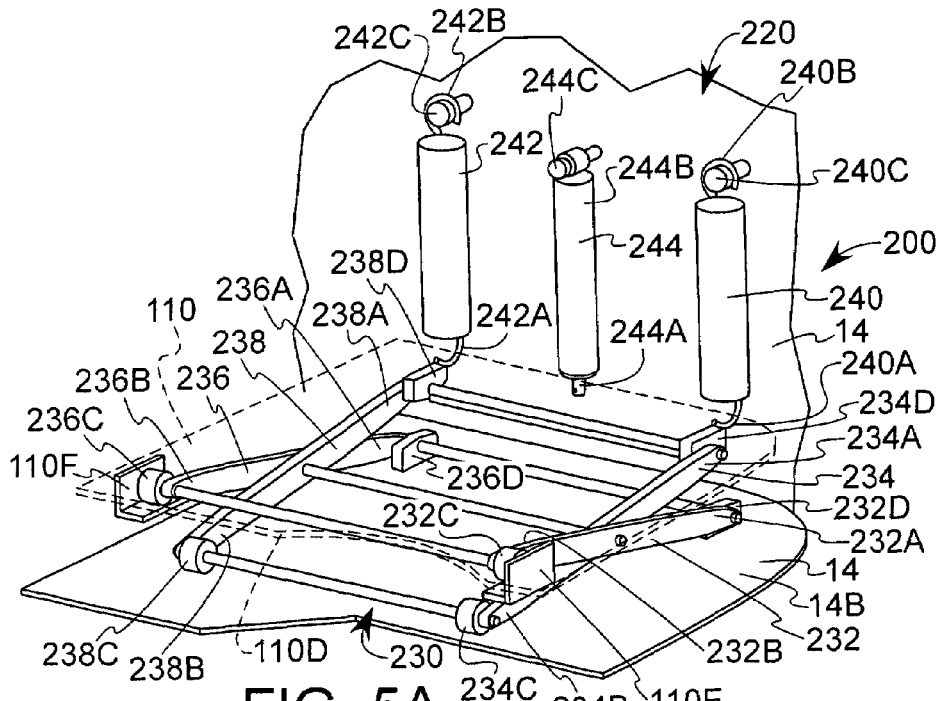
FIG. 5A is a view similar to FIG. 5 with the floorboard shown in phantom.

An operator support assembly 200 constructed in accordance with a second embodiment of the present invention is illustrated in FIGS. 5 and 5A, where like reference numerals indicate like elements. The operator support assembly 200 may be incorporated into a truck similar to the one illustrated in FIG. 1 or other materials handling vehicles. The operator support assembly 200 comprises a suspended floorboard 110 and an energy absorbing structure 220 coupled to the truck main body frame 14 and the suspended floorboard 110 for absorbing and dissipating at least a portion of the energy resulting from disturbances encountered by the truck as it moves across a floor surface prior to the energy portion reaching the operator standing on the suspended floorboard 110. The energy absorbing structure 220 comprises a scissors mechanism 230, first and second tension springs 240 and 242, and a damper 244. In this embodiment, the first and second tension springs 240 and 242 and the damper 244 are generally vertically positioned and coupled between the truck main body frame 14 and the floorboard 110. As the floorboard 110 is coupled to the scissors mechanism 230, as discussed below, the first and second tension springs 240 and 242 and the damper 244 may alternatively be coupled between the truck main body frame 14 and the scissors mechanism 230. It is also contemplated that only a single tension spring may be used instead of the first and second springs 240 and 242.

The scissors mechanism 230 comprises a pair of first and second scissor arms 232 and 234 and a pair of third and fourth scissor arms 236 and 238. The first scissor arm 232 is pivotably coupled at a first end 232A to a base 14B of the frame 14 via a block 232D and has a second end 232B provided with a roller 232C which moves back and forth along a first track 110E fixedly coupled to the bottom surface 110D of the floorboard 110. The second scissor arm 234 is pivotably coupled at a first end 234A to the floorboard 110 via a block 234D and has a second end 234B provided with a roller 234C in movable engagement with the base 14B of the frame 14. The third scissor arm 236 is pivotably coupled at a first end 236A to the base 14B of the frame 14 via a block 236D and has a second end 236B provided with a roller 236C which moves back and forth along a second track 110F fixedly coupled to the bottom surface 110D of the floorboard 100. The fourth scissor arm 238 is pivotably coupled at a first end 238A to the floorboard 110 via a block 238D and has a second end 238B provided with a roller 238C in movable engagement with the base 14B of the frame 14.

As illustrated in FIGS. 5 and 5A, the first and second tension springs 240 and 242 are coupled at first ends 240A and 242A to the floorboard 110 and coupled at second ends 240B and 242B to the truck main body frame 14 via bolts 240C and 242C. The damper 244 may comprise a damper commercially available from Stabilus (Germany) under the product designation Stab-O-Shoc. From mathematical calculations, it is believed that the damper 244 should have having a linear damping rate of 4-10 pounds-second/inch for compression, 10-20 pounds-second/inch for extension, and a stroke length between about 1 inch to about 5 inches and preferably about 2 inches. The damper 244 comprises a piston rod 244A coupled via a pin 245 to a bracket 210C fixedly coupled to the floorboard 110. A cylinder 244B of the damper 244 is coupled to the frame 14 via a bolt 244C.

The scissors mechanism 230 is positioned beneath the floorboard 110 and supports the floorboard 110 within the truck rider compartment 30, see FIG. 5. The scissors mechanism 230 functions as the sole support for the floorboard 110; hence, the floorboard 110 is suspended in the rider compartment 30 on the scissors mechanism 230. Due to the pivotable relationship of the first and second arms 232 and 234 and the pivotable relationship of the third and fourth arms 236 and 238 and because the rollers 234C and 238C are capable of moving along the base 14B of the frame 14 and the rollers 232C and 236C are capable of moving along the tracks 110E and 110F, the scissors mechanism 230 moves upward and downward in the vertical direction, indicated by arrow 202 in FIG. 5, as the truck encounters disturbances during movement along a floor surface. The floorboard 110 moves with the scissors mechanism 230. The springs 240 and 242 function to absorb at least a portion of energy resulting from the disturbances encountered by the truck as it moves along a floor surface. The springs 240 and 242 extend or retract in response to receiving kinetic energy and as such store the kinetic energy as potential energy. The damper 244 functions to absorb the energy released from the springs 240 and 242 as the springs 240 and 242 return to an initial position following extension or retraction, i.e., the damper 244 converts the energy stored in the springs 240 and 242 into heat. The damper 244 further performs a damping function as the springs 240 and 242 are extended or retracted. By absorbing and dissipating the energy resulting from disturbances encountered by the truck, the springs 240 and 242 and damper 244 function to substantially reduce impact and vibration energy from reaching the operator standing on the floorboard 110.

Figure 6:
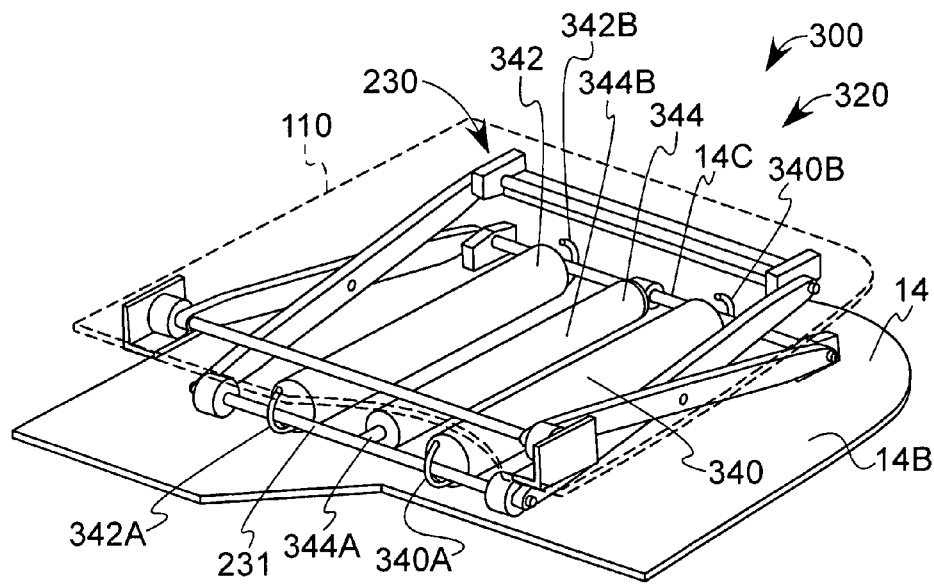
FIG. 6 is a perspective view of an operator support assembly constructed in accordance with a third embodiment of the present invention.

An operator support assembly 300 constructed in accordance with a third embodiment of the present invention is illustrated in FIG. 6, where like reference numerals indicate like elements. The operator support assembly 300 may be incorporated into a truck similar to the one illustrated in FIG. 1 or other materials handling vehicles. The operator support assembly 300 comprises a suspended floorboard 110 and an energy absorbing structure 320 coupled to the base 14B of the truck main body frame 14 and the suspended floorboard 110 for absorbing and dissipating at least a portion of energy resulting from disturbances encountered by the truck as it moves across a floor surface prior to the energy portion reaching the operator standing on the suspended floorboard 110. The energy absorbing structure 320 comprises a scissors mechanism 230, first and second tension springs 340 and 342, and a damper 344. The scissors mechanism 230 is constructed in the same manner as the one illustrated in FIGS. 5 and 5A. In this embodiment, however, the first and second tension springs 340 and 342 and the damper 344 are generally horizontally positioned and coupled between the truck main body frame 14 and the scissors mechanism 230. It is also contemplated that only a single tension spring may be used instead of the first and second springs 340 and 342.

The first and second tension springs 340 and 342 are coupled at first ends 340A and 342A to the scissors mechanism 230 via a cross bar 231 and coupled at second ends 340B and 342B to the truck main body frame base 14B via a cross bar 14C. The damper 344 may comprise a damper commercially available from Stabilus (Germany) company under the product designation Stab-O-Shoc. From mathematical calculations, it is believed that the damper 344 should have a linear damping rate of 4-10 pounds-second/inch for compression, 10-20 pounds-second/inch for extension, and a stroke length between about 1 inch to about 5 inches and preferably about 2 inches. The damper 344 may comprise a piston rod 344A coupled to the cross bar 231. A cylinder 344B of the damper 344 is coupled to the frame base 14B via the cross bar 14C.

The springs 340 and 342 function to absorb at least a portion of energy transferred to the floorboard 110 resulting from the disturbances encountered by the truck 10 in which the operator support assembly 300 is incorporated. The springs 340 and 342 receive the energy resulting in the extension or retraction of the springs 340 and 342. By extending or retracting, the springs 340 and 342 store potential energy. The damper 344 functions to absorb the energy released from the springs 340 and 342 as the springs 340 and 342 return to an initial position following being extended or retracted, i.e., the damper 344 converts the energy from the springs 340 and 342 into heat. The damper 344 further performs a damping function as the springs 340 and 342 are extended or retracted. By absorbing and dissipating the energy resulting from disturbances encountered by the truck, the springs 340 and 342 and damper 344 function to substantially reduce impact and vibration energy from reaching the operator standing on the floorboard 110.

An operator support assembly 400 constructed in accordance with a fourth embodiment of the present invention is illustrated in FIGS. 7 and 7A-7F, where like reference numerals indicate like elements. The operator support assembly 400 may be incorporated into a truck similar to the one illustrated in FIG. 1 or other materials handling vehicles. The operator support assembly 400 comprises a suspended floorboard 110 and an energy absorbing structure 420 coupled to the truck main body frame 14 and the suspended floorboard 110 for absorbing and dissipating at least a portion of energy resulting from disturbances encountered by the truck as it moves across a floor surface prior to the energy portion reaching the operator standing on the suspended floorboard 110. The energy absorbing structure 420 comprises a scissors mechanism 230, and an adjustable spring and damper assembly 430. The scissors mechanism 230 is constructed in the same manner as the one illustrated in FIGS. 5 and 5A.

Figure 7:
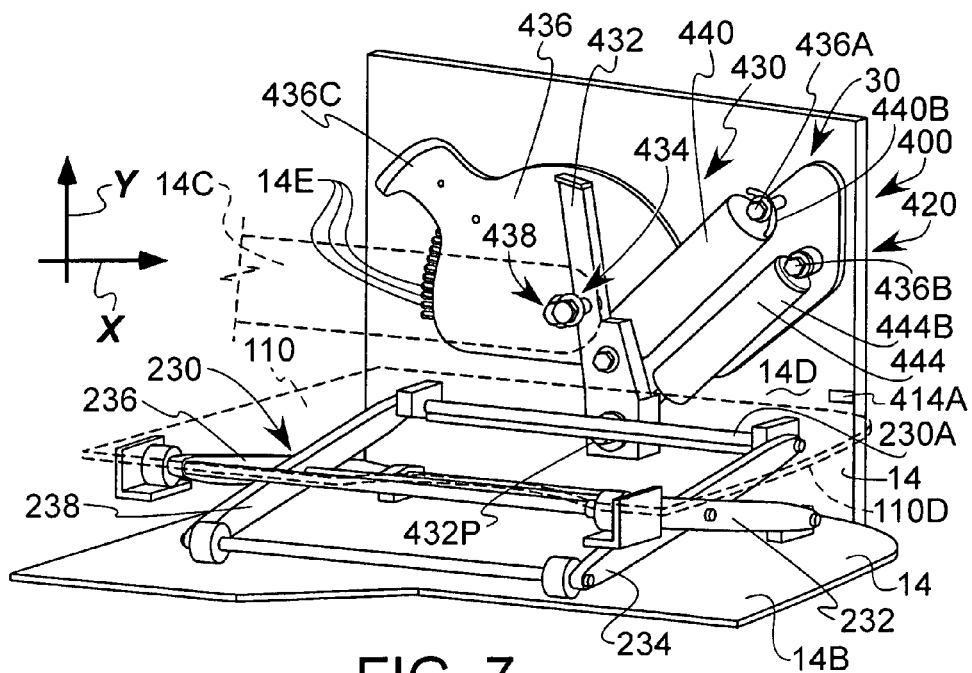
FIG. 7 is a perspective view of an operator support assembly constructed in accordance with a fourth embodiment of the present invention.
Figure 7A:
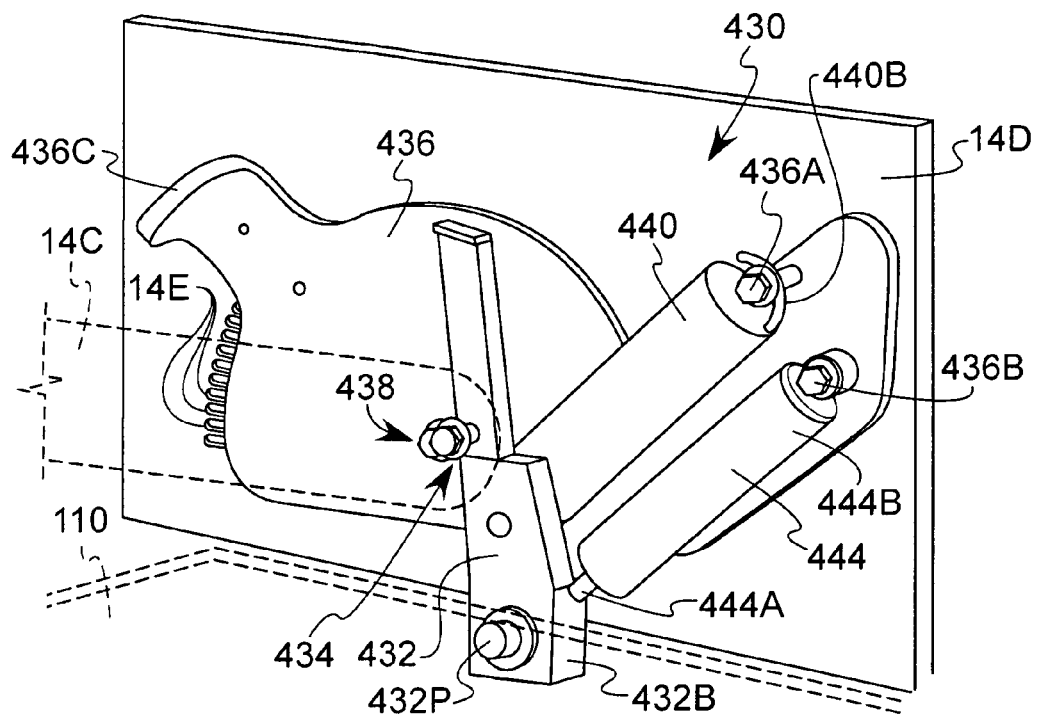
FIG. 7A is a perspective view of an adjustable spring and damper assembly forming part of the operator support assembly illustrated in FIG. 7.
Figure 7B:
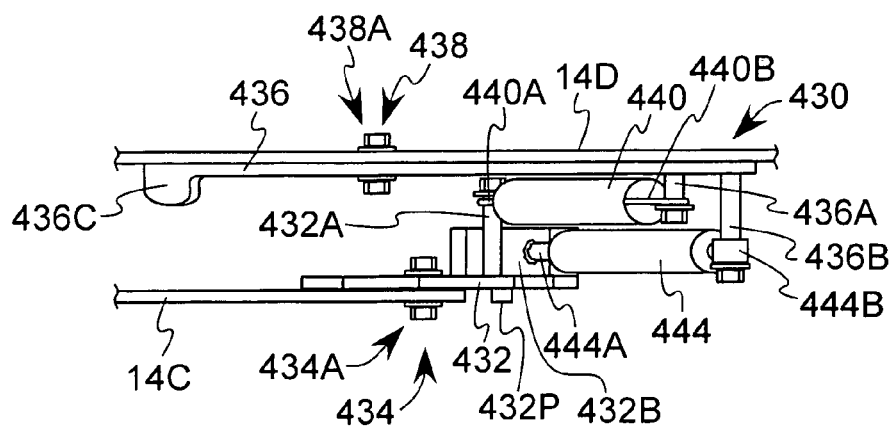
FIG. 7B is a top view of the adjustable spring and damper assembly forming part of the operator support assembly illustrated in FIG. 7.

The adjustable spring and damper assembly 430 comprises a first member 432 pivotable about a first pivot point 434 defined by a bolt/nut combination 434A coupling the first member 432 to an extending member 14C of the truck main body frame 14, and a second member 436 pivotable about a second pivot point 438 defined by a bolt/nut combination 438A coupling the second member 436 to a side wall 14D of the truck main body frame 14, see FIGS. 7, 7A and 7B. The first pivot point 434 is spaced from the second pivot point 438, as best seen in FIGS. 7C-7F. A pin 432P extends outwardly from the first member 432 and is coupled to a cross member 230A of the scissors mechanism 230 such that upward and downward movement of the scissors mechanism 230 is transferred to the first member 432 causing rotation of the first member 432 about the first pivot point 434.

A spring 440 and a damper 444 extend between and are coupled to the first and second members 432 and 436, see FIGS. 7A and 7B. A first end 440A of the spring 440 is coupled to a bolt 432A extending from the first member 432. A second end 440B of the spring 440 is coupled to a bolt 436A extending from the second member 436. A piston rod 444A of the damper 444 is coupled to an extension 432B of the first member 432. A cylinder 444B of the damper 444 is coupled to a bolt 436B extending from the second member 436.

The scissors mechanism 230 is positioned beneath the floorboard 110 and supports the floorboard 110 within the truck rider compartment 30, see FIG. 7. The scissors mechanism 230 functions as the sole support for the floorboard 110; hence, the floorboard 110 is suspended in the rider compartment 30 on the scissors mechanism 230. The floorboard 110 moves with the scissors mechanism 230. As noted above, the pin 432P extends from the first member 432 and is fixedly coupled to the cross member 230A of the scissors mechanism 230. Hence, movement of the scissors mechanism 230 and the floorboard 110 is transferred to the first member 432.

The spring 440 functions to absorb at least a portion of energy resulting from the disturbances encountered by the truck 10 as it moves across a floor surface. The spring 440 extends and retracts resulting in it storing energy. The damper 444 functions to absorb the energy released from the spring 440 as the spring 440 retracts or extends, i.e., the damper 444 converts the energy stored in the spring 440 into heat. The damper 444 further performs a damping function as the spring 440 is extended or retracted. By absorbing and dissipating the energy resulting from disturbances encountered by the truck 10, the spring 440 and damper 444 function to substantially reduce impact and vibration energy from reaching the operator standing on the floorboard 110.

The second member 436 includes a lever portion 436C, which may be gripped by an operator. The second member 436 further includes a protrusion (not shown) which is adapted to be received in one of a plurality of recesses 14E formed in the side wall 14D of the truck main body frame 14 so as to retain the second member 436 in a desired position. By gripping the lever portion 436C, an operator may rotate the second member 436 about the second pivot point 438 to change its position relative to the side wall 14D, see FIGS. 7C and 7F. By changing the angular position of the second member 436, the preload on the spring 440 as well as its angular position relative to the side wall 14D may be varied. By rotating the second member 436 counter-clockwise, as viewed in FIGS. 7C and 7F, the length of the spring 440 is increased slightly such that the preload on the spring 440 is increased. By increasing the preload on the spring 440, the magnitude of a force F applied by the spring 440 to the first member 432 increases, see FIG. 7C. Further, the spring 440 becomes more vertically oriented with the counter-clockwise rotation of the second member 436, compare FIG. 7C with FIG. 7F. The force F applied by the spring 440 to the first member 432 can be resolved into two components, $F_X$ and $F_Y$, see FIG. 7C. When the spring 440 is more vertically oriented, the magnitude of its force component $F_Y$ increases. Consequently, when rotating the second member 436 counter-clockwise, the force applied by the spring 440 in the Y direction to the scissors mechanism 230 and, hence, the floorboard 110, increases. Conversely, when rotating the second member 436 clockwise, the force applied by the spring 440 in the Y direction to the scissors mechanism 230 and, hence, the floorboard 110, decreases.

An upper stop 414A is fixedly coupled to the side wall 14D of the truck main body frame 14 so as to limit upward movement of the floorboard 110, see FIG. 7. One or more lower stops (not shown) are fixed to a lower surface 110D of the floorboard 110 to limit downward movement of the floorboard 110 relative to the base 14B of the frame 14, i.e., the lower stops engage the base 14B to prevent further downward movement of the floorboard 110. The upper and lower stops may be made of natural rubber, urethane, silicone or other like elastomeric type material. The stops in a preferred embodiment provide a force deflection characteristic, i.e., they deflect by x amount when a force F is applied against the stop, as described by the following polynomial equation:

$$F = -27.88x^3 + 251x^2 + 86.7x$$

wherein F=force, and x=deflection.

Figure 7D:
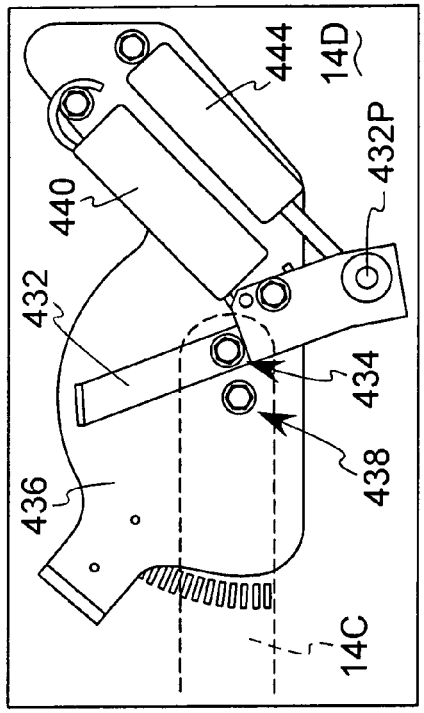
FIGS. 7C-7F are side views illustrating various angular positions of the first and second members of the adjustable spring and damper assembly illustrated in FIG. 7.
Figure 7F:
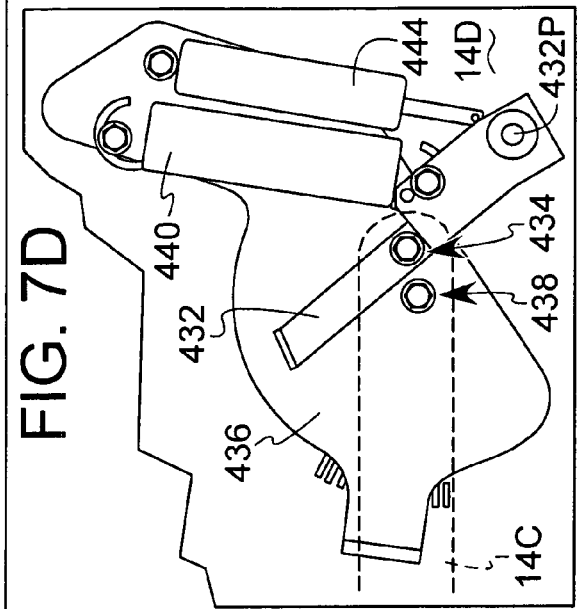
Figure 7C:
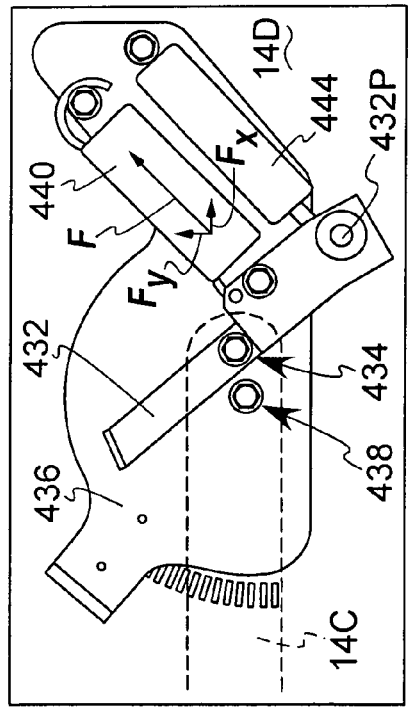
Figure 7E:
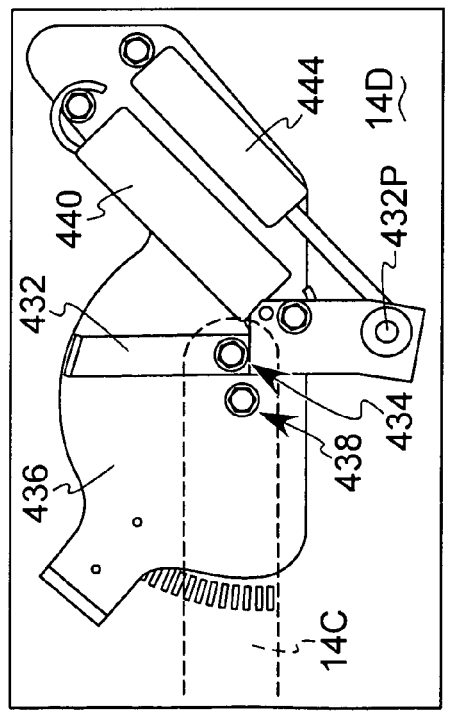

Preferably, the position of the floorboard 110 is located in a neutral position between an upper stop position, where the floorboard 110 engages the upper stop 414A and a lower stop position, where the lower stops on the floorboard 110 engage the base of the frame 14. In the illustrated embodiment, the "neutral position" is equal to a predefined position falling within a range equal to ±15% of a centered position. The first member 432 of the adjustable spring and damper assembly 430 is positioned as shown in FIG. 7C when the floorboard 110 is positioned in its upper stop position, the first member 432 is positioned as shown in FIG. 7E when the floorboard 110 is positioned in its lower stop position and the first member 432 is positioned as shown in FIG. 7D when the floorboard 110 is positioned in its neutral position. The maximum distance that the floorboard 110 moves between its upper and lower stop positions may be from about 1 inch to about 5 inches and preferably is about 2 inches.

When a light-weight operator is positioned on the floorboard 110, the floorboard 110 may be spaced from the neutral position toward the upper stop 414A. Conversely, when a heavy-weight operator is positioned on the floorboard 110, the floorboard 110 may be spaced from the neutral position toward the base 14B of the frame 14. So as to allow the floorboard 110 to be located in its neutral position subsequent to an operator stepping onto the floorboard 110, an operator grips the lever portion 436C and rotates the second member 436 in an appropriate direction so as to change the preload on the spring 440 as well as its angular orientation such that the floorboard 110 is repositioned to its neutral position. A mark (not shown) may be provided on a wall of the frame which, when aligned with the floorboard 110, indicates to the operator that the floorboard 110 has been moved to its neutral position. It is believed that the floorboard 110 may accommodate an operator having a weight that falls within a substantially broad range, e.g., from about 100 pounds to about 300 pounds, and yet still be moved to its neutral position by varying the preload on and angular position of the spring 440.

It is preferred that the operator support assembly 400 have a natural frequency between about 1.5 to about 2.5 Hz. It is further preferred that the floorboard 110 typically move only within a range of positions well within its upper and lower stop positions during normal operation of the truck 10. It is believed that an energy absorbing structure 420 coupled to a floorboard 100 supporting an operator having a weight between about 100 pounds and 300 pounds and capable of achieving these two objections may include a spring 440 having a relaxed length (prior to being coupled to the first and second members 432 and 436) of from about 6 inches to about 10 inches, and a spring rate of from about 50 pounds/inch to about 200 pounds/inch.

It is noted that the energy absorbing structure 420 is small in size so as to allow the structure 420 to be easily housed or located behind a rider compartment interior wall of the main body frame 14.

It is believed that the operator support assembly 400 is advantageous as it minimizes shock and vibration transmission to an operator; reduces vehicle ride harshness; allows for significant operator weight range, e.g., 100 pounds to 300 pounds; provides an acceptable ride quality, i.e., softness, during vehicle operation; maintains an acceptable firmness when an operator enters and exits the vehicle; and may be manufactured at an acceptable cost.

Figure 8:
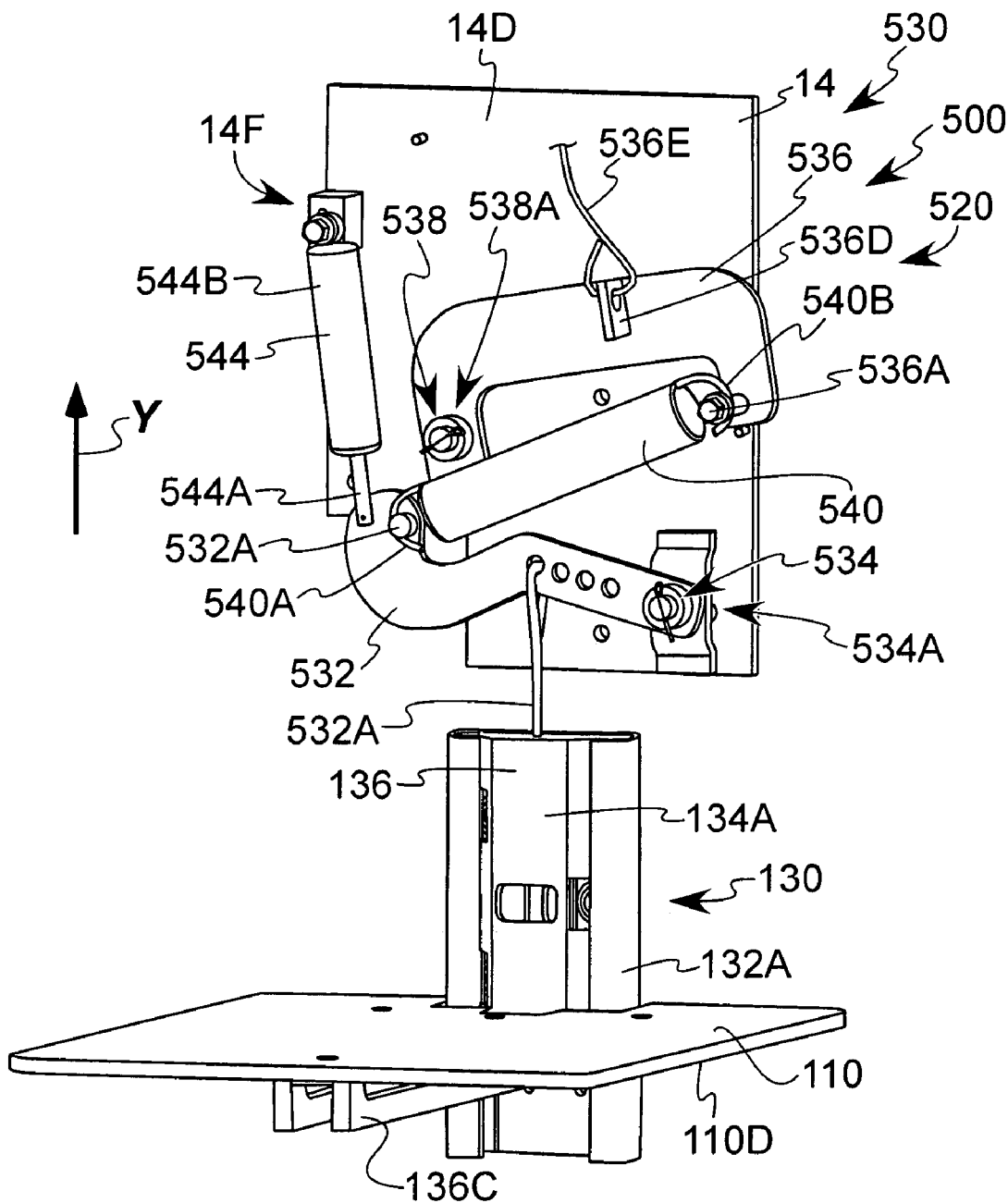
FIG. 8 is a perspective view of an operator support assembly constructed in accordance with a fifth embodiment of the present invention.

An operator support assembly 500 constructed in accordance with a fifth embodiment of the present invention is illustrated in FIG. 8, where like reference numerals indicate like elements. The operator support assembly 500 may be incorporated into a truck similar to the one illustrated in FIG. 1 or other materials handling vehicles. The operator support assembly 500 comprises a suspended floorboard 110 and an energy absorbing structure 520 coupled to the truck main body frame 14 and the suspended floorboard 110 for absorbing and dissipating at least a portion of energy resulting from disturbances encountered by the truck as it moves across a floor surface prior to the energy portion reaching the operator standing on the suspended floorboard 110. The energy absorbing structure 520 comprises a mast assembly 130 and an adjustable spring and damper assembly 530.

The mast assembly 130 is constructed in the same manner as the one illustrated in FIGS. 2-4. It comprises a channel 132A fixedly coupled to the frame 14 of the truck main body 12, and a carriage assembly 134A capable of vertical movement within the channel 132A. The carriage assembly 134A comprises a main body 136 and a floorboard support 136C.

The adjustable spring and damper assembly 530 comprises a first member 532 pivotable about a first pivot point 534 defined by a pin 534A coupling the first member 532 to a wall 14D of the truck main body frame 14, and a second member 536 pivotable about a second pivot point 538 defined by a pin 538A coupling the second member 536 to the wall 14D of the truck main body frame 14. The first pivot point 534 is spaced from the second pivot point 538. A cable 532A extends from the first member 532 and is fixedly coupled to the carriage assembly 134A such that upward and downward movement of the carriage assembly 134A is transferred to the first member 532.

An extension spring 540 extends between and is coupled to the first and second members 532 and 536, while a damper 544 extends between and is coupled to the first member 532 and the wall 14D. A first end 540A of the spring 540 is coupled to a bolt 532A extending from the first member 532. A second end 540B of the spring 540 is coupled to a bolt 536A extending from the second member 536. A piston rod 544A of the damper 544 is coupled to the first member 532. A cylinder 544B of the damper 544 is coupled to a bolt/block combination 14F extending from the wall 14D.

The floorboard support 136C is positioned beneath the floorboard 110 and supports the floorboard 110 within the truck rider compartment. The carriage assembly 134A functions as the sole support for the floorboard 110; hence, the floorboard 110 is suspended in the rider compartment on the carriage assembly 134A. The floorboard 110 moves with the carriage assembly 134A. As noted above, the cable 532A extends from the first member 532 and is fixedly coupled to the carriage assembly 134A. Hence, movement of the carriage assembly 134A and the floorboard 110 is transferred to the first member 532.

The spring 540 functions to absorb at least a portion of energy resulting from the disturbances encountered by the truck 10 as it moves along a floor surface. The spring 540 extends or retracts resulting in potential energy being stored by the spring 540. The damper 544 functions to absorb the energy resulting from the spring 540 as the spring 540 retracts and extends, i.e., the damper 544 converts the energy stored in the spring 540 into heat. The damper 544 further performs a damping function as the spring 540 is extended or retracted. By absorbing and dissipating the energy resulting from disturbances encountered by the truck, the spring 540 and damper 544 function to substantially reduce impact and vibration energy from reaching the operator standing on the floorboard 110.

The second member 536 includes a tab 536D having an opening for receiving a cable 536E, which may be gripped by an operator to adjust the angular position of the second member 536 relative to the wall 14D. Once the angle of the second member 536 has been adjusted, the cable is tied to an element (not shown) extending from the wall 14D so as to retain the second member 536 in the set position. By changing the angular position of the second member 536, the preload on the spring 540 as well as its angular position relative to the first member 532 may be varied. When rotating the second member 536 counter-clockwise, the force applied by the spring 540 in a Y direction to the carriage assembly 134A increases. Conversely, when rotating the second member 536 clockwise, the force applied by the spring 540 in a Y direction to the carriage assembly 134A decreases.

An upper stop (not shown) is fixedly coupled to the truck main body frame 14 so as to limit upward movement of the floorboard 110. One or more lower stops (not shown) are fixed to a lower surface 110D of the floorboard 110 to limit downward movement of the floorboard 110 relative to the base (not shown in FIG. 8) of the frame 14, i.e., the lower stops engage the base to prevent further downward movement of the floorboard 110. The upper and lower stops may be made of natural rubber, urethane, silicone or other like elastomeric type material. The stops in a preferred embodiment provide a force deflection characteristic, i.e., they deflect by x amount when a force F is applied against the stop, as described by the following polynomial equation:

$$F=-27.88x^3+251x^2+86.7x$$

wherein F=force, and x=deflection.

Preferably, the floorboard 110 is located in a neutral position between an upper stop position, where the floorboard 110 engages the upper stop and a lower stop position, where the lower stops on the floorboard 110 engage the base of the frame 14. In the illustrated embodiment, the "neutral position" is equal to a predefined position falling within a range equal to ±15% of a centered position.

When a light-weight operator is positioned on the floorboard 110, the floorboard 110 may be spaced from the neutral position toward the upper stop. Conversely, when a heavy-weight operator is positioned on the floorboard 110, the floorboard 110 may be spaced from the neutral position toward the base of the frame 14. So as to allow the floorboard 110 to be positioned in its neutral position subsequent to an operator stepping onto the floorboard 110, an operator grips the cable 536E and pulls it so as to rotate the second member 536 in an appropriate direction to change the preload on the spring 540 as well as its angular orientation such that the floorboard 110 is repositioned to its neutral position. A mark (not shown) may be provided on a wall of the frame which, when aligned with the floorboard 110, indicates to the operator that the floorboard 110 has been moved to its neutral position. It is believed that the floorboard 110 may accommodate an operator having a weight that falls within a substantially broad range, e.g., from about 100 pounds to about 300 pounds, and yet still be moved to its neutral position by varying the preload on the spring 440.

Figure 9:
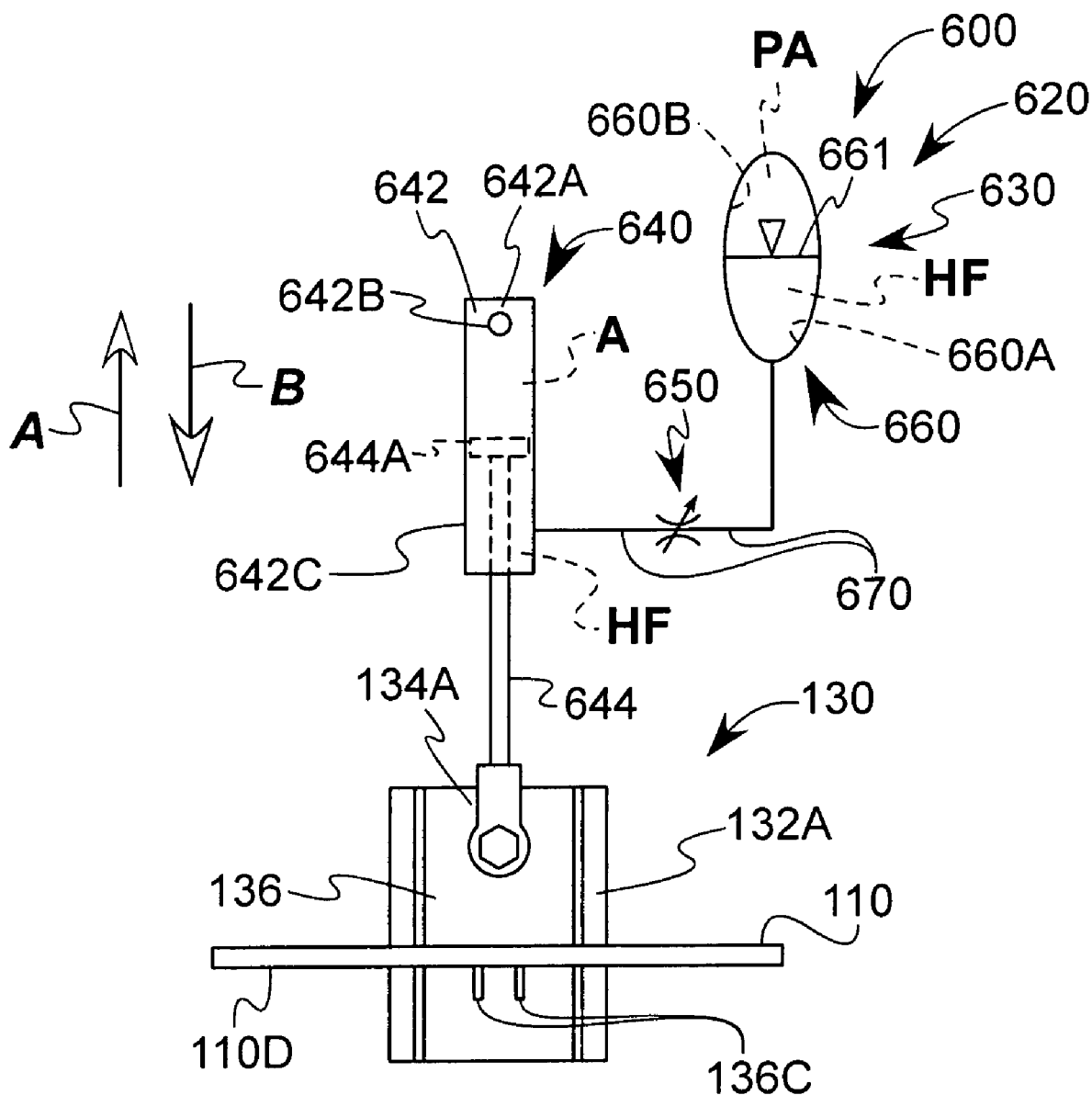
FIG. 9 is a schematic view of an operator support assembly constructed in accordance with a sixth embodiment of the present invention.

An operator support assembly 600 constructed in accordance with a sixth embodiment of the present invention is illustrated in FIG. 9, where like reference numerals indicate like elements. The operator support assembly 600 may be incorporated into a truck similar to the one illustrated in FIG. 1 or other materials handling vehicles. The operator support assembly 600 comprises a suspended floorboard 110 and an energy absorbing structure 620 coupled to the truck main body frame 14 and the suspended floorboard 110 for absorbing and dissipating at least a portion of energy resulting from disturbances encountered by the truck as it moves across a floor surface prior to the energy portion reaching the operator standing on the suspended floorboard 110. The energy absorbing structure 620 comprises a mast assembly 130 and a suspension system 630.

The mast assembly 130 is constructed in the same manner as the one illustrated in FIGS. 2-4. It comprises a channel 132A fixedly coupled to the frame 14 of the truck main body 12, and a carriage assembly 134A capable of vertical movement within the channel 132A. The carriage assembly 134A comprises a main body 136 and a floorboard support 136C.

The suspension system 630 comprises a hydraulic piston/cylinder unit 640, a needle valve 650, an air charged accumulator 660 (also referred to herein as a ride accumulator) and tubing 670. A cylinder 642 of the unit 640 is fixed to the frame 14 of the truck main body 12. A piston rod 644 of the unit 640 is bolted to the main body 136 of the carriage assembly 134A such that the piston rod 644 moves with the floorboard 110. The piston rod 644 is threaded into, bolted or otherwise coupled to a piston 644A, which also forms part of the unit 640 and is movable within the cylinder 642. A first portion 642A of the cylinder 642, i.e., the portion above the piston 644A, is provided with an opening 642B so as to permit air A at atmospheric pressure to enter into the cylinder portion 642A. A second portion 642C of the cylinder 642, i.e., the portion below the piston 644A, is filled with hydraulic fluid HF. Hence, the piston 644A separates the two cylinder portions 642A and 642C and defines a barrier so as to prevent air and hydraulic fluid HF from mixing within the cylinder 642.

The needle valve 650 restricts or limits hydraulic fluid flow from the hydraulic piston/cylinder unit 640 into the air charged accumulator 660 and from the air charged accumulator 660 into the unit 640.

A diaphragm 661 is provided within the accumulator 660 to separate the interior of the accumulator 660 into a lower portion 660A and an upper portion 660B. The lower portion 660A is filled with hydraulic fluid HF, while the upper portion 660B is filled with pressurized air PA. It is contemplated that the upper portion 660B may be filled with another gas, such as nitrogen gas. In the embodiment illustrated in FIG. 9, the quantity of the air PA in the accumulator upper portion 660B is not changed once the upper portion 660B is pressurized during manufacturing. The pressurized air PA applies a force to the hydraulic fluid HF such that the fluid HF within the accumulator 660 and the cylinder 642 is under pressure. The tubing 670 allows hydraulic fluid HF to move from the piston/cylinder unit 640 through the needle valve 650 into the accumulator 660 and from the accumulator 660 through the needle valve 650 into the piston/cylinder unit 640. It is contemplated that the diaphragm type accumulator illustrated in FIG. 9 may be replaced by other known types of equivalent accumulators such as piston/cylinder type or bladder type accumulators.

The floorboard support 136C is positioned beneath the floorboard 110 and supports the floorboard 110 within the truck rider compartment. The carriage assembly 134A functions as the sole support for the floorboard 110; hence, the floorboard 110 is suspended in the rider compartment on the carriage assembly 134A. The floorboard 110 moves with the carriage assembly 134A. As noted above, the piston rod 644 is fixedly coupled to the carriage assembly 134A. Hence, movement of the carriage assembly 134A and the floorboard 110 is transferred to the piston rod 644 and the piston 644A.

When a truck including the operator support assembly 600 travels over a hole, the piston 644A and piston rod 644 move upward in the cylinder 642, see direction arrow A in FIG. 9. This movement causes hydraulic fluid HF to be supplied by the accumulator 660 through the needle valve 650 into the cylinder second portion 642C. After hydraulic fluid HF is supplied to the cylinder second portion 642C, the piston 644A and piston rod 644 move in the opposite direction, i.e., downward in the cylinder 642, due to re-application of the weight of the operator to the floorboard 110, causing hydraulic fluid HF to be forced in a reverse direction through the needle valve 650 into the accumulator 660. The needle valve 650 produces a damping effect. That is, the needle valve 650 functions to convert kinetic energy of the moving pressurized fluid, i.e., the hydraulic fluid moving from the accumulator 660 through the needle valve 650 into the cylinder 642 and from the cylinder 642 through the needle valve 650 into the accumulator 660, into heat. The damping rate of the needle valve 650 is defined by the size of the opening within the needle valve 650 and the properties of the hydraulic fluid HF.

When the truck including the operator support assembly 600 travels over a bump, the piston 644A and piston rod 644 move downward in the cylinder 642, see direction arrow B in FIG. 9. This movement causes hydraulic fluid HF to be forced from the cylinder second portion 642C through the needle valve 650 into the accumulator 660. After hydraulic fluid HF is forced by the piston 644A through the needle valve 650 into the accumulator 660, the pressurized air PA within the accumulator 660 acts to force hydraulic fluid in a reverse direction back through the needle valve 650 into the cylinder 642. The needle valve 650 produces a damping effect in response to fluid movement. That is, the needle valve 650 functions to convert kinetic energy of the moving pressurized hydraulic fluid HF, i.e., the hydraulic fluid HF moving from the cylinder 642 through the needle valve 650 into the accumulator 660 and from the accumulator 660 through the needle valve 650 into the cylinder 642, into heat. The air and the accumulator 660 function as a spring. That is, the accumulator 660 and the air function to store potential energy resulting from hydraulic fluid HF being forced from the cylinder second portion 642C through the needle valve 650 into the accumulator 660 due to downward movement of the piston 644A.

By absorbing and dissipating the energy resulting from the disturbances encountered by the truck, the suspension system 630 functions to substantially reduce impact and vibration energy from reaching the operator standing on the floorboard 110.

An upper stop (not shown) is fixedly coupled to the truck main body frame 14 so as to limit upward movement of the floorboard 110. One or more lower stops (not shown) are fixed to a lower surface 110D of the floorboard 110 to limit downward movement of the floorboard 110 relative to a base (not shown in FIG. 9) of the frame 14, i.e., the lower stops engage the base to prevent further downward movement of the floorboard 110. The upper and lower stops may be made of natural rubber, urethane, silicone or other like elastomeric type material. The stops in a preferred embodiment provide a force deflection characteristic, i.e., they deflect by x amount when a force F is applied against the stop, as described by the following polynomial equation:

$$F = -27.88x^3 + 251x^2 + 86.7x$$

wherein F=force, and x=deflection.

Preferably, the floorboard 110 is located in a neutral position between an upper stop position, where the floorboard 110 engages the upper stop and a lower stop position, where the lower stops on the floorboard 110 engage the base of the frame 14. In the illustrated embodiment, the "neutral position" is equal to a predefined position falling within a range equal to ±15% of a centered position.

Preferably, the quantity of the air PA in the accumulator 660 (or a corresponding air pressure within the accumulator 660 when an operator is not positioned on the floorboard 110) is selected so that when an operator, having a predetermined weight, is positioned on the floorboard 110, the floorboard 110 remains within a predefined range of the neutral position, e.g., within a range equal to +/−15% of the neutral position. For example, if the accumulator 660 is precharged to a first pressure, such as 67 pounds/inch$^2$, an operator having a weight within a first weight range, such as from about 250 pounds to about 300 pounds, may be positioned on the floorboard 110, with the floorboard 110 remaining within the predefined range of the neutral position under normal operating conditions. As a further example, if the accumulator 660 is precharged to a second pressure, such as 30 pounds/inch$^2$, an operator having a weight within a second weight range, such as from about 100 pounds to about 125 pounds, may be positioned on the floorboard 110, with the floorboard 110 remaining within the predefined range of the neutral position under normal operating conditions. Further, the size of the opening or orifice in the needle valve 650 and the properties of the hydraulic fluid HF are preferably selected so as to define a flow rate through the needle valve 650 such that the floorboard 110 is prevented from engaging the upper stop when the truck moves over bumps or obstructions of a size typically encountered by such trucks and further to allow the needle valve 650 to quickly damp out energy resulting from disturbances typically encountered by the truck.

Figure 10:
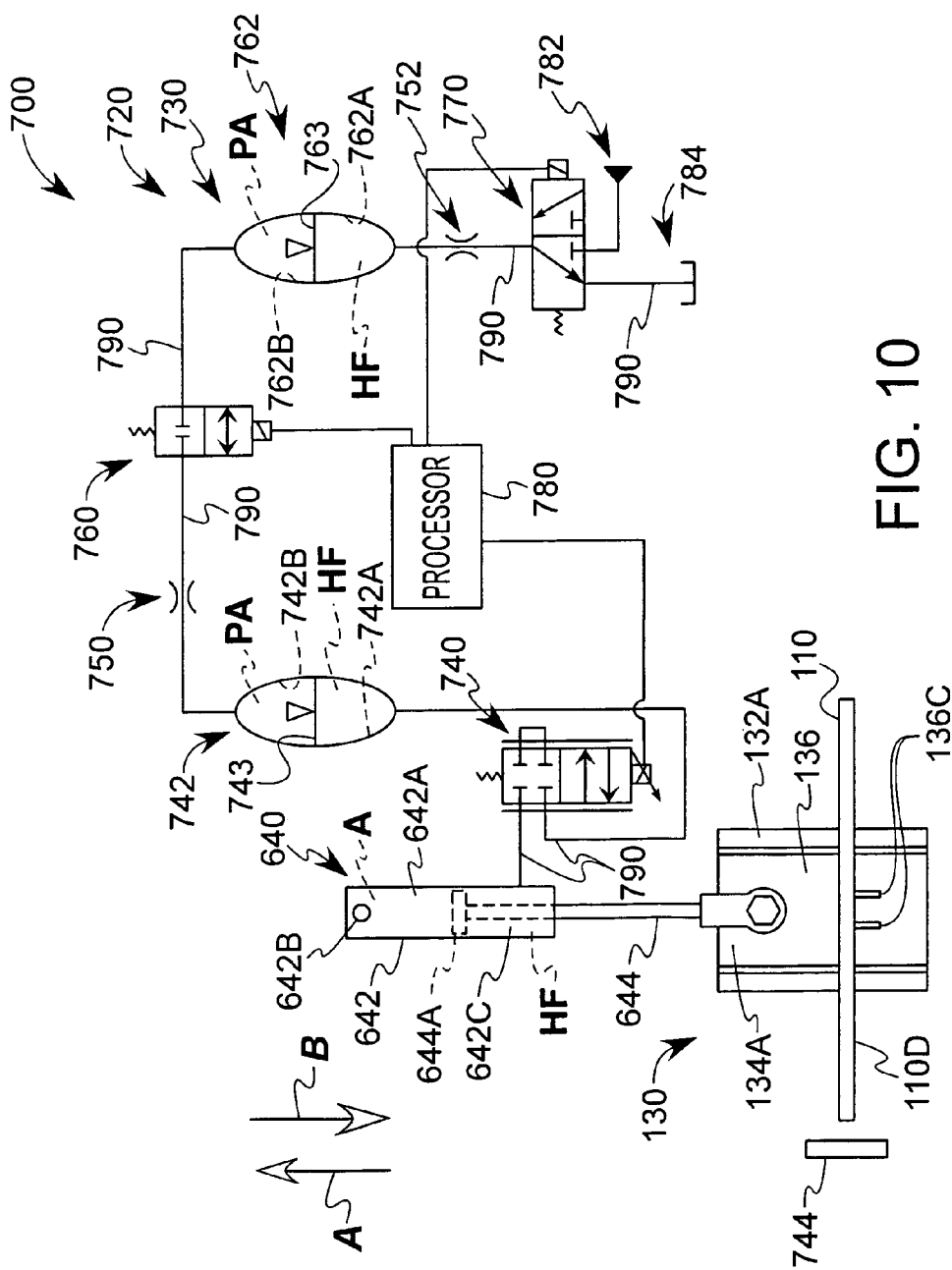
FIG. 10 is a schematic view of an operator support assembly constructed in accordance with a seventh embodiment of the present invention.

An operator support assembly 700 constructed in accordance with a seventh embodiment of the present invention is illustrated in FIG. 10, where like reference numerals indicate like elements. The operator support assembly 700 may be incorporated into a truck similar to the one illustrated in FIG. 1 or other materials handling vehicles. The operator support assembly 700 comprises a suspended floorboard 110 and an energy absorbing structure 720 coupled to the truck main body frame 14 and the suspended floorboard 110 for absorbing and dissipating at least a portion of energy resulting from disturbances encountered by the truck as it moves across a floor surface prior to the energy portion reaching the operator standing on the suspended floorboard 110. The energy absorbing structure 720 comprises a mast assembly 130 and a suspension system 730.

The mast assembly 130 is constructed in the same manner as the one illustrated in FIGS. 2-4. It comprises a channel 132A fixedly coupled to the frame 14 of the truck main body 12, and a carriage assembly 134A capable of vertical movement within the channel 132A. The carriage assembly 134A comprises a main body 136 and a floorboard support 136C.

The suspension system 730 comprises a hydraulic piston/cylinder unit 640, a 2 position 4-way proportional valve 740, a ride accumulator 742, a first flow restrictor or orifice 750, a 2-way blocking type pneumatic valve 760, a height adjust accumulator 762, a second flow restrictor or orifice 752, a 2 position 3-way solenoid valve 770, a processor 780 and tubing 790 extending between the piston/cylinder unit 640, the valves 740, 760 and 770, the accumulators 742 and 762 and the orifices 750 and 752. The operation of the valves 740, 760 and 770 is controlled via the processor 780.

The piston/cylinder unit 640 is constructed in the same manner as the one illustrated in FIG. 9. It comprises a cylinder 642 fixed to the frame 14 of the truck main body 12. A piston rod 644 of the unit 640 is bolted to the main body 136 of the carriage assembly 134A such that the piston rod 644 moves with the floorboard 110. The piston rod 644 is threaded into, bolted or otherwise coupled to a piston 644A, which also forms part of the unit 640 and is movable within the cylinder 642. A first portion 642A of the cylinder 642, i.e., the portion above the piston 644A, is provided with an opening 642B so as to permit air A at atmospheric pressure to enter into the cylinder portion 642A. A second portion 642C of the cylinder 642, i.e., the portion below the piston 644A, is filled with hydraulic fluid HF.

As noted above, the operation of the 2 position 4-way proportional valve 740 is controlled via the processor 780. In a first position, the valve 740 is in a closed state such that hydraulic fluid is not permitted to enter or leave the cylinder second portion 642C. When in its closed state, the valve 740 maintains the fluid volume within the cylinder 642 constant so as to lock the floorboard 110 in a fixed position relative to the frame 14 of the truck main body 12. The floorboard 110, when locked in a fixed position, provides an operator with a firm feel as he/she steps into or out of the rider compartment 30. The processor 780 may function to move the valve 740 to its first position when the truck is not in motion, e.g., when power is not being delivered to the first and second driven wheels.

In a second position, the valve 740 is in an opened state to allow hydraulic fluid HF to flow from the cylinder 642 to the accumulator 742 and from the accumulator 742 to the cylinder 642. The size of the opening within the valve 740 is controlled via the processor 780 such that the valve 740 performs a damping function. The valve opening is preferably defined so as to effect an optimal damping function, i.e., to quickly damp out energy resulting from disturbances encountered by the truck. In the illustrated embodiment, the processor 780 opens the valve 740 when an operator selects a direction of travel such that power is provided to the first and second driven wheels. It is preferred that the processor 780 open the valve 740 slowly so as to make any movement of the floorboard 110 upon being unlocked substantially unnoticeable to the operator. The processor 780 may close the valve 740 so as to lock the floorboard 110 in position when an operator is no longer depressing the presence sensor 40.

A diaphragm 743 is provided within the ride accumulator 742 to separate the interior of the accumulator 742 into a lower portion 742A and an upper portion 742B. The lower portion 742A of the ride accumulator 742 is filled with hydraulic fluid HF, while the upper portion 742B is filled with pressurized air PA. It is contemplated that the upper portion 742B may be filled with another gas, such as nitrogen gas. As will be discussed below, the quantity of air PA in the accumulator upper portion 742B may be varied. When the valve 740 is in its second position, the pressurized air PA in the accumulator upper portion 742B applies a force to the hydraulic fluid HF in the accumulator lower portion 742A such that the pressure of the hydraulic fluid HF in the accumulator lower portion 742A and the cylinder second portion 642C is substantially the same. It is also noted that when the valve 740 is in its second position, tubing 790 extending between the cylinder 642, the valve 740 and the accumulator 742 defines a path for hydraulic fluid HF to move from the piston/cylinder unit 640 through the valve 740 into the accumulator 742 and from the accumulator 742 through the valve 740 into the piston/cylinder unit 640. It is contemplated that the diaphragm type accumulator 742 may be replaced by other known types of equivalent accumulators such as piston/cylinder type or bladder type accumulators.

As will be discussed below, when the processor 780 is not effecting a floorboard height adjustment operation, it maintains the 2-way block type pneumatic valve 760 in a closed state. With the valve 760 closed, pressurized air does not enter or leave the accumulator 742.

The floorboard support 136C is positioned beneath the floorboard 110 and supports the floorboard 110 within the truck rider compartment. The carriage assembly 134A functions as the sole support for the floorboard 110; hence, the floorboard 110 is suspended in the rider compartment on the carriage assembly 134A. The floorboard 110 moves with the carriage assembly 134A. As noted above, the piston rod 644 is fixedly coupled to the carriage assembly 134A. Hence, movement of the carriage assembly 134A and the floorboard 110 is transferred to the piston rod 644 and the piston 644A.

Presuming the valve 740 is in its second position and valve 760 is in its closed state, when a truck including the operator support assembly 700 travels over a hole, the piston 644A and piston rod 644 move upward in the cylinder 642, see direction arrow A in FIG. 10. This movement causes hydraulic fluid HF to be supplied by the accumulator 742 through the valve 740 into the cylinder second portion 642C. After hydraulic fluid HF is supplied to the cylinder second portion 642C, the piston 644A and piston rod 644 move in the opposite direction, i.e., downward in the cylinder 642, due to re-application of the weight of the operator to the floorboard 110, causing hydraulic fluid HF to be forced in a reverse direction through the valve 740 into the accumulator 742. As noted above, the opening within the valve 740 is preferably defined by the processor 780 so as to optimize damping. The valve 740 effects damping by converting kinetic energy of the moving pressurized fluid, i.e., the hydraulic fluid moving from accumulator 742 through the valve 740 into the cylinder 642 and from the cylinder 642 through the valve 740 into the accumulator 742, into heat.

Presuming again that the valve 740 is in its second position and valve 760 is in its closed state, when the truck including the operator support assembly 700 travels over a bump, the piston 644A and piston rod 644 move downward in the cylinder 642, see direction arrow B in FIG. 10. This movement causes hydraulic fluid HF to be forced from the cylinder second portion 642C through the valve 740 into the accumulator 742. After hydraulic fluid HF is forced by the piston 644A through the valve 740 into the accumulator 742, the resulting increased air pressure within the accumulator 742 acts to force hydraulic fluid in a reverse direction back through the valve 740 into the cylinder 642. As noted above, the valve 740 produces a damping effect in response to fluid movement. That is, the valve 740 functions to convert kinetic energy of the moving pressurized hydraulic fluid HF, i.e., the hydraulic fluid HF moving from the cylinder 642 through the valve 740 into the accumulator 742 and from the accumulator 742 through the valve 740 into the cylinder 642, into heat. The air and the accumulator 742 function as a spring. That is, the accumulator 742 and air function to store potential energy resulting from hydraulic fluid HF being forced from the cylinder second portion 642C through the valve 740 into the accumulator 742.

An upper stop (not shown in FIG. 10) is fixedly coupled to the truck main body frame 14 so as to limit upward movement of the floorboard 110. One or more lower stops (not shown) are fixed to a lower surface 110D of the floorboard 110 to limit downward movement of the floorboard 110 relative to the base (not shown in FIG. 10) of the frame 14, i.e., the lower stops engage the base to prevent further downward movement of the floorboard 110. The upper and lower stops may be made of natural rubber, urethane, silicone or other like elastomeric type material. The stops in a preferred embodiment provide a force deflection characteristic, i.e., they deflect by x amount when a force F is applied against the stop, as described by the following polynomial equation:

$$F = -27.88x^3 + 251x^2 + 86.7x$$

wherein F=force, and x=deflection.

Preferably, the floorboard 110 is located in a neutral position between an upper stop position, where the floorboard 110 engages the upper stop and a lower stop position, where the lower stops on the floorboard 110 engage the base of the frame 14. In the illustrated embodiment, the "neutral position" is equal to a predefined position falling within a range equal to ±15% of a centered position.

When a light-weight operator steps onto the floorboard 110, the floorboard 110, after being unlocked, may move so as to be spaced from the neutral position toward the upper stop. Conversely, when a heavy-weight operator steps onto the floorboard 110, the floorboard 110, after being unlocked, may move so as to be spaced from the neutral position toward the base of the frame 14. To allow the floorboard 110 to be moved to its neutral position after an operator steps onto the floorboard 110 and the floorboard 110 is unlocked, the processor 780 effects a floorboard height adjustment operation. Such an operation is effected in the illustrated embodiment just after the floorboard 110 is unlocked. As noted above, the floorboard 110 may be unlocked when an operator, standing on the floorboard 110, selects a direction of travel for the truck, i.e., when power is provided to the first and second driven wheels.

A sensor 744, such as a conventional linear position sensor, fixed to the main body frame 14, may be provided to detect when the floorboard is spaced from its predefined neutral position. Alternatively, switches, such as conventional microswitches, may be provided to sense when the floorboard 110 has moved away from its neutral position. As will be discussed further below, the processor 780, when effecting a floorboard height adjustment operation, controls the operation of the 2 position 4-way proportional valve 740, the 2-way blocking type pneumatic valve 760, and the 2 position 3-way solenoid valve 770 to move the floorboard 110 to its neutral position. It is believed that the floorboard 110 may accommodate an operator having a weight that falls within a substantially broad range, e.g., from about 100 pounds to about 300 pounds, and yet still be moved to its neutral position after the operator steps onto the floorboard 110 and the floorboard 110 is unlocked.

When the processor 780 determines during a floorboard height adjustment operation, based on signals generated by the sensor 744, that the floorboard 110 needs to be moved upward relative to the truck main body frame 14, the processor 780 causes pressurized air to be added to the accumulator 742. When the processor 780 determines during a floorboard height adjustment operation, based on signals generated by the sensor 744, that the floorboard 110 needs to be moved downward relative to the truck main body frame 14, the processor 780 releases pressurized air from the accumulator 742. Apparatus and process steps for adding pressurized air to or releasing pressurized air from the accumulator 742 will now be discussed.

When the processor 780 is not effecting a floorboard height adjustment operation, it maintains the 2-way block type pneumatic valve 760 in a closed state. With the valve 760 closed, pressurized air does not enter or leave the accumulator 742.

A diaphragm 763 is provided within the height adjust accumulator 762 to separate the interior of the accumulator 762 into a lower portion 762A and an upper portion 762B. As will be discussed further below, the lower portion 762A of the accumulator 762 may be filled with hydraulic fluid HF, while the upper portion 762B of the accumulator 762 may contain pressurized air PA. It is contemplated that the upper portion 762B may contain another gas, such as nitrogen gas. It is further contemplated that the diaphragm type accumulator 762 may be replaced by other known types of equivalent accumulators such as piston/cylinder type or bladder type accumulators. For example, a piston/cylinder type accumulator may be beneficial as they typically have a range of usable volume which is greater than that of a diaphragm type accumulator.

When the processor 780 is not effecting a floorboard height adjustment operation, it maintains the 2 position 3-way solenoid valve 770 in a first position to allow hydraulic fluid contained in the lower portion 762A of the accumulator 762 to drain from the lower portion 762A through the valve 770 into a hydraulic fluid reservoir 784.

The total amount of air in the accumulators 742 and 762 is fixed. However, air may be moved from the ride accumulator 742 to the height adjust accumulator 762 and vice versa. Hence, the portion of the air in the accumulator 742, which portion comprises part of the total quantity of air in the accumulators 742 and 762, may be varied.

When the processor 780 determines during a floorboard height adjustment operation, based on signals generated by the sensor 744, that the floorboard 110 needs to be moved upward relative to the truck main body frame 14, the processor 780 initially maintains the 2-way block type pneumatic valve 760 in its closed state. With the valve 760 in its closed state, the processor 780 causes the 2 position 3-way solenoid valve 770 to move to a second position. When in its second position, the valve 770 allows hydraulic fluid HF provided by a source of pressurized hydraulic fluid 782, such as a hydraulic pump, to pass through the valve 770 into the lower portion 762A of the accumulator 762. Pressurized hydraulic fluid HF entering the accumulator 762 causes the pressure of the air within the upper portion 762B of the accumulator 762 to increase. Just after the valve 770 is moved to its second position, the processor 780 causes the 2-way block type pneumatic valve 760 to move to its open state, resulting in pressurized air flowing through the valve 760 into the ride accumulator 742.

An increase in the air quantity within the upper portion 742B of the accumulator 742 results in an increase in hydraulic fluid pressure within both the accumulator 742 and the cylinder 642. In the illustrated embodiment, the valve 740 is opened prior to the processor 780 effecting the floorboard height adjustment operation as the height adjustment operation occurs just after the floorboard 110 is unlocked by opening the valve 740. The increased fluid quantity within the cylinder 642 causes the floorboard 110 to move upward relative to the truck main body frame 14. Once the floorboard 110 is raised to its neutral position, as sensed by the sensor 744, the processor 780 causes the valve 760 to move to its closed state and subsequently causes the valve 770 to move to its first position. As noted above, when the valve 770 is moved to its first position, hydraulic fluid drains from the lower portion 762A of the accumulator 762 through the valve 770 into a hydraulic fluid reservoir 784.

The first flow restrictor or orifice 750 limits the rate at which pressurized air passes from the height adjust accumulator 762 to the ride accumulator 742 and the second flow restrictor or orifice 752 limits the rate at which pressurized hydraulic fluid moves into the lower portion 762A of the accumulator 762. By restricting the flow of air through the first restrictor 750 and the flow of fluid through the second restrictor 752, the rate at which the floorboard 110 is raised is limited to an acceptable value.

When the processor 780 determines during a floorboard height adjustment operation, based on signals generated by the sensor 744, that the floorboard 110 needs to be moved downward relative to the truck main body frame 14, the processor 780 moves the 2-way block type pneumatic valve 760 to its open state. The valve 770 is normally in its first position. The processor 780 does not change the position of the valve 770 when the floorboard 110 is lowered. Because the valve 770 is in its first position, little if any hydraulic fluid HF is contained in the lower portion 762A of the accumulator 762. With little or no hydraulic fluid provided in the accumulator lower portion 762A, the air pressure within the upper portion 762B of the accumulator 762 is low and, typically, is substantially lower than the air pressure within the upper portion 742B of the accumulator 742. Hence, once the valve 760 is moved to its open state, pressurized air is released from the upper portion 742B of the accumulator 742 and moves into the upper portion 762B of the accumulator 762. Once the floorboard 110 is lowered to its neutral position, as sensed by the sensor 744, the processor 780 causes the valve 760 to move to its closed state.

The first flow restrictor or orifice 750 limits the rate at which pressurized air exits the ride accumulator 742. By restricting the flow of air through the first restrictor 750, the rate at which the floorboard 110 is lowered falls within an acceptable range, i.e., the floorboard 110 is not lowered too quickly.

Figure 11:
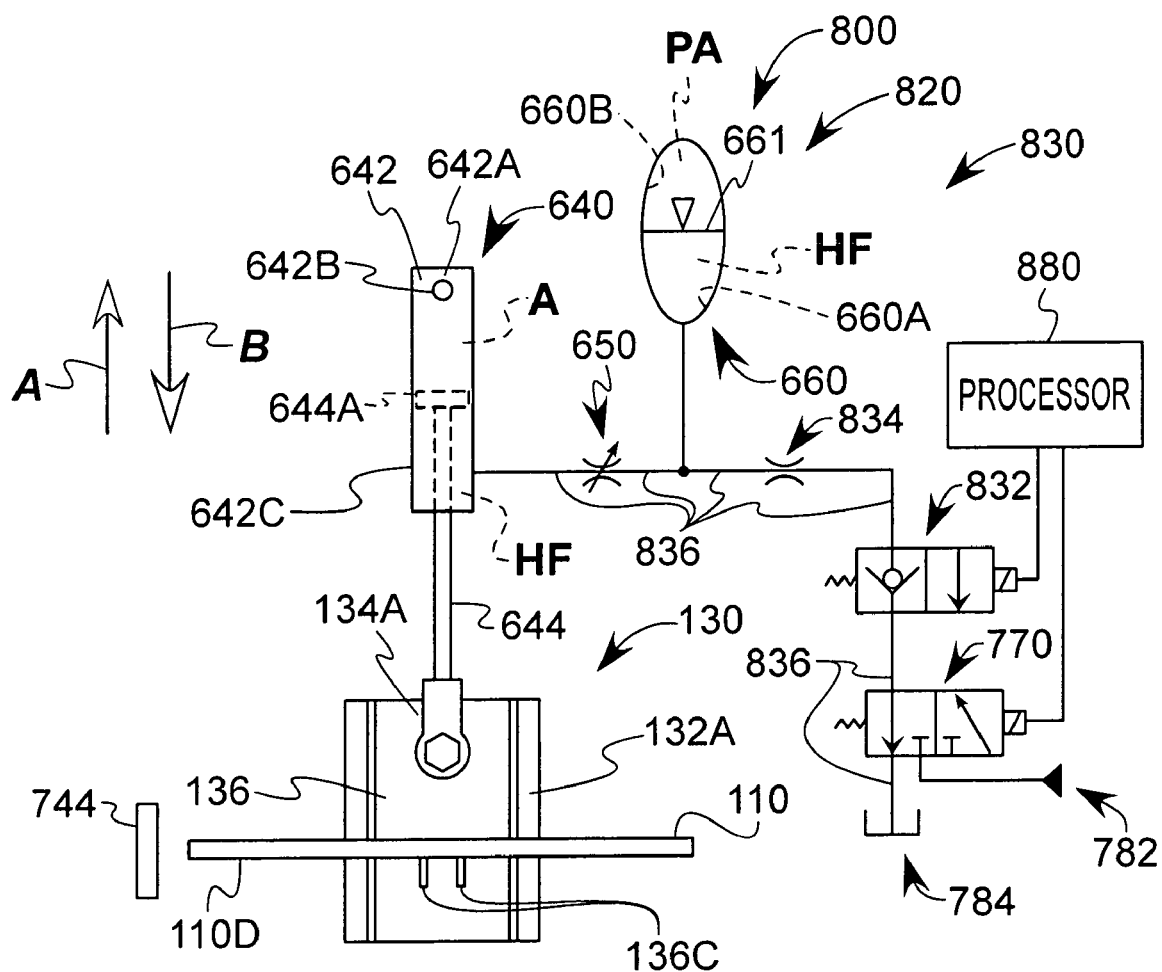
FIG. 11 is a schematic view of an operator support assembly constructed in accordance with a eighth embodiment of the present invention.

An operator support assembly 800 constructed in accordance with an eighth embodiment of the present invention is illustrated in FIG. 11, where like reference numerals indicate like elements. The operator support assembly 800 may be incorporated into a truck similar to the one illustrated in FIG. 1 or other materials handling vehicles. The operator support assembly 800 comprises a suspended floorboard 110 and an energy absorbing structure 820 coupled to the truck main body frame 14 and the suspended floorboard 110 for absorbing and dissipating at least a portion of energy resulting from disturbances encountered by the truck as it moves across a floor surface prior to the energy portion reaching the operator standing on the suspended floorboard 110. The energy absorbing structure 820 comprises a mast assembly 130 and a suspension system 830.

The mast assembly 130 is constructed in the same manner as the one illustrated in FIGS. 2-4. It comprises a channel 132A fixedly coupled to the frame 14 of the truck main body 12, and a carriage assembly 134A capable of vertical movement within the channel 132A. The carriage assembly 134A comprises a main body 136 and a floorboard support 136C.

The suspension system 830 comprises a hydraulic piston/cylinder unit 640, a needle valve 650, an air charged accumulator 660, a two-way normally closed poppet type valve 832, a 2 position 3-way solenoid valve 770, an orifice 834, a processor 880 and tubing 836 extending between the piston/cylinder unit 640, the valves 650, 832 and 770, the accumulator 660 and the orifice 834. The operation of the valves 832 and 770 is controlled via the processor 880.

The piston/cylinder unit 640, needle valve 650 and air charged accumulator 660 are constructed in essentially the same manner as the unit 640, valve 650 and accumulator 660 illustrated in FIG. 9.

The floorboard support 136C is positioned beneath the floorboard 110 and supports the floorboard 110 within the truck rider compartment. The carriage assembly 134A functions as the sole support for the floorboard 110; hence, the floorboard 110 is suspended in the rider compartment on the carriage assembly 134A. The floorboard 110 moves with the carriage assembly 134A. As noted above, the piston rod 644 is fixedly coupled to the carriage assembly 134A. Hence, movement of the carriage assembly 134A and the floorboard 110 is transferred to the piston rod 644 and the piston 644A.

When a truck including the operator support assembly 800 travels over a hole, the piston 644A and piston rod 644 move upward in the cylinder 642, see direction arrow A in FIG. 11. This movement causes hydraulic fluid HF to be supplied by the accumulator 660 through the needle valve 650 into the cylinder second portion 642C. After hydraulic fluid HF is supplied to the cylinder second portion 642C, the piston 644A and piston rod 644 move in the opposite direction, i.e., downward in the cylinder 642, due to re-application of the weight of the operator to the floorboard 110, causing hydraulic fluid HF to be forced in a reverse direction through the needle valve 650 into the accumulator 660. The needle valve 650 produces a damping effect. That is, the needle valve 650 functions to convert kinetic energy of the moving pressurized fluid, i.e., the hydraulic fluid moving from the accumulator 660 through the needle valve 650 into the cylinder 642 and from the cylinder 642 through the needle valve 650 into the accumulator 660, into heat. The damping rate of the needle valve 650 is defined by the size of the opening within the needle valve 650 and the properties of the hydraulic fluid HF.

When the truck including the operator support assembly 800 travels over a bump, the piston 644A and piston rod 644 move downward in the cylinder 642, see direction arrow B in FIG. 11. This movement causes hydraulic fluid HF to be forced from the cylinder second portion 642C through the needle valve 650 into the accumulator 660. After hydraulic fluid HF is forced by the piston 644A through the needle valve 650 into the accumulator 660, the pressurized air PA within the accumulator 660 acts to force hydraulic fluid in a reverse direction back through the needle valve 650 into the cylinder 642. The needle valve 650 produces a damping effect in response to fluid movement. That is, the needle valve 650 functions to convert kinetic energy of the moving pressurized hydraulic fluid HF, i.e., the hydraulic fluid HF moving from the cylinder 642 through the needle valve 650 into the accumulator 660 and from the accumulator 660 through the needle valve 650 into the cylinder 642, into heat. The air and the accumulator 660 function as a spring. That is, the accumulator 660 and the air function to store potential energy resulting from hydraulic fluid HF being forced from the cylinder second portion 642C through the needle valve 650 into the accumulator 660 due to downward movement of the piston 644A.

By absorbing and dissipating the energy resulting from the disturbances encountered by the truck, the suspension system 830 functions to substantially reduce impact and vibration energy from reaching the operator standing on the floorboard 110.

An upper stop (not shown) is fixedly coupled to the truck main body frame 14 so as to limit upward movement of the floorboard 110. One or more lower stops (not shown) are fixed to a lower surface 110D of the floorboard 110 to limit downward movement of the floorboard 110 relative to a base (not shown in FIG. 11) of the frame 14, i.e., the lower stops engage the base to prevent further downward movement of the floorboard 110. The upper and lower stops may be made of natural rubber, urethane, silicone or other like elastomeric type material. The stops in a preferred embodiment provide a force deflection characteristic, i.e., they deflect by x amount when a force F is applied against the stop, as described by the following polynomial equation:

$$F=-27.88x^3+251x^2+86.7x$$

wherein F=force, and x=deflection.

Preferably, the floorboard 110 is located in a neutral position between an upper stop position, where the floorboard 110 engages the upper stop and a lower stop position, where the lower stops on the floorboard 110 engage the base of the frame 14. In the illustrated embodiment, the "neutral position" is equal to a predefined position falling within a range equal to ±15% of a centered position.

When a light-weight operator steps onto the floorboard 110, the floorboard 110 may move so as to be spaced from the neutral position toward the upper stop. Conversely, when a heavy-weight operator steps onto the floorboard 110, the floorboard 110 may move so as to be spaced from the neutral position toward the base of the frame 14. To allow the floorboard 110 to be moved to its neutral position after an operator steps onto the floorboard 110, the processor 880 effects a floorboard height adjustment operation. Such an operation is effected in the illustrated embodiment just after an operator, standing on the floorboard 110, selects a direction of travel for the truck, i.e., when power is provided to the first and second driven wheels. Alternatively, a floorboard height adjustment operation may be effected just after an operator enters the operator's compartment and activates the presence sensor 40.

A sensor 744, such as a conventional linear position sensor, fixed to the main body frame 14, may be provided to detect when the floorboard 110 is spaced from its predefined neutral position. Alternatively, switches, such as conventional microswitches, may be provided to sense when the floorboard 110 has moved away from its neutral position. As will be discussed further below, the processor 880, when effecting a floorboard height adjustment operation, controls the operation of the two-way normally closed poppet type valve 832 and the 2 position 3-way solenoid valve 770 to move the floorboard 110 to its neutral position. It is believed that the floorboard 110 may accommodate an operator having a weight that falls within a substantially broad range, e.g., from about 100 pounds to about 300 pounds, and yet still be moved to its neutral position after the operator steps onto the floorboard 110 and the floorboard 110 is unlocked.

When the processor 880 determines during a floorboard height adjustment operation, based on signals generated by the sensor 744, that the floorboard 110 needs to be moved upward relative to the truck main body frame 14, the processor 880 causes pressurized fluid HF to be added to the lower portion 660A of the accumulator 660 and the cylinder second portion 642C. When the processor 880 determines during a floorboard height adjustment operation, based on signals generated by the sensor 744, that the floorboard 110 needs to be moved downward relative to the truck main body frame 14, the processor 880 causes pressurized fluid HF to be released from the accumulator lower portion 660A and the cylinder second portion 642C. Apparatus and process steps for adding pressurized fluid to or releasing pressurized fluid HF from the accumulator 660 will now be discussed.

When the processor 880 is not effecting a floorboard height adjustment operation, it maintains the 2 position 3-way solenoid valve 770 in a first position to allow hydraulic fluid to pass through the valve 770 to a hydraulic fluid reservoir 784.

When the processor 880 determines during a floorboard height adjustment operation, based on signals generated by the sensor 744, that the floorboard 110 needs to be moved upward relative to the truck main body frame 14, the processor 880 causes the 2 position 3-way solenoid valve 770 to move to its second position. When in its second position, the valve 770 allows hydraulic fluid HF provided by a source of pressurized hydraulic fluid 782, such as a hydraulic pump, to pass through the valve 770. The pressurized hydraulic fluid HF also passes through the valve 832 and enters into the lower portion 660A of the accumulator 660 as well as the cylinder 642. The increased fluid quantity in the cylinder 642 causes the floorboard 110 to move upward relative to the truck main body frame 14. Once the floorboard 110 is raised to its neutral position, as sensed by the sensor 744, the processor 880 causes the valve 770 to return to its first position such that pressurized fluid is no longer provided to the accumulator 660 and the cylinder 642. The normally closed valve 832 is not actuated by the processor 880 when the floorboard 110 is being raised. When the valve 832 is not actuated, i.e., in its normally closed state, the valve 832 only allows pressurized fluid to pass through it and enter the accumulator 660 but does not allow pressurized fluid to exit the accumulator 660.

The orifice 834 limits the rate at which pressurized hydraulic fluid HF moves into the lower portion 660A of the accumulator 660 and the cylinder 642. By restricting the flow of fluid through the orifice 834, the rate at which the floorboard 110 is raised is limited to an acceptable value.

When the processor 880 determines during a floorboard height adjustment operation, based on signals generated by the sensor 744, that the floorboard 110 needs to be moved downward relative to the truck main body frame 14, the processor 880 moves the normally closed valve 832 to its opened state, i.e., the valve 832 is actuated. The valve 832 is only actuated when the floorboard 110 is being lowered. Hence, during all other times, including normal operation of the truck, the valve 832 remains in its normally closed state. The processor 880 does not change the position of the valve 770 when the floorboard 110 is lowered, i.e., the valve 770 remains in its first position. Once the valve 832 is moved to its opened state, pressurized fluid is released from the lower portion 660A of the accumulator 660 and the cylinder 642, thereby reducing the fluid quantity in the cylinder 642. The reduced fluid quantity in the cylinder 642 causes the floorboard 110 to move downward relative to the truck main body frame 14. Once the floorboard 110 is lowered to its neutral position, as sensed by the sensor 744, the processor 880 causes the valve 832 to move to its normally closed state.

The orifice 834 again limits the rate at which pressurized fluid exits the accumulator 660. By restricting the flow of fluid through the orifice 834, the rate at which the floorboard 110 is lowered falls within an acceptable range, i.e., the floorboard 110 is not lowered too quickly.

An operator support assembly 900 constructed in accordance with a ninth embodiment of the present invention is illustrated in FIGS. 12-17, where like reference numerals indicate like elements. The operator support assembly 900 may be incorporated into a truck similar to the one illustrated in FIG. 1 or other materials handling vehicles. The operator support assembly 900 comprises a suspended floorboard 910, which defines a floor in the truck rider compartment, and an energy absorbing structure 920. In the illustrated embodiment, the operator support assembly 900 may comprise a single assembly, which may be assembled as a single unit prior to being mounted to the truck main body frame 14.

The energy absorbing structure 920 is coupled to the truck main body frame 14 and the suspended floorboard 910 for absorbing and dissipating at least a portion of energy resulting from disturbances encountered by the truck 10 as it moves across a floor surface prior to the energy portion reaching the operator standing on the suspended floorboard 910. The disturbances may result from the truck 10 passing over a continuously uneven surface, or moving over large bumps or sharp drops in the surface. In the embodiment illustrated in FIGS. 12-17, the energy absorbing structure 920 comprises a mast assembly 930, first and second tension springs 940 and 942, a damper 944, and spring preload adjusting structure 950.

Figure 17:
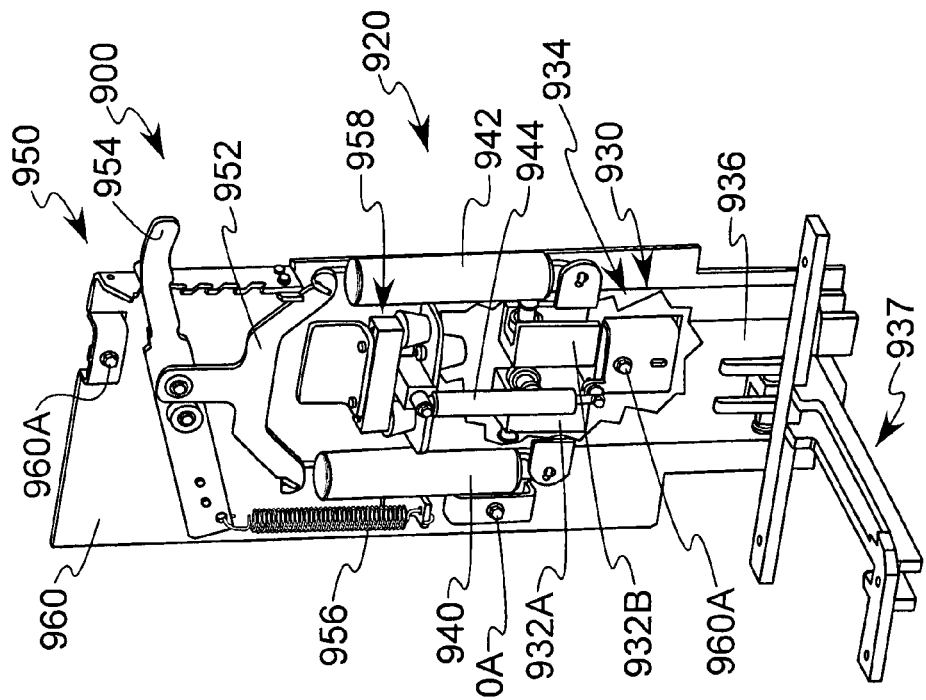
FIG. 17 is a perspective view of the operator support assembly of FIG. 12, with a portion of the carriage assembly main body removed.
Figure 16:
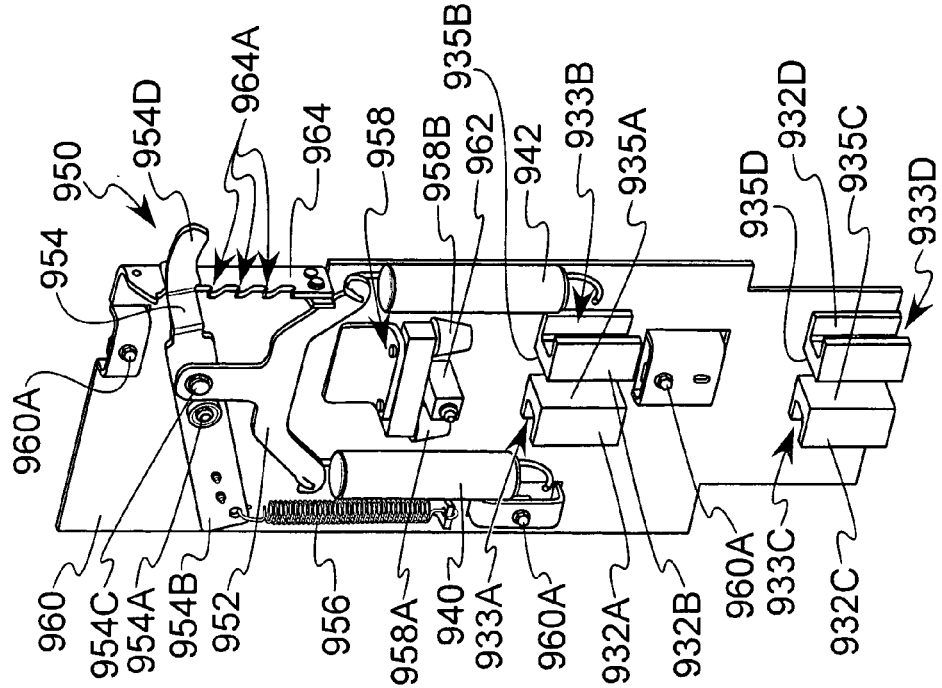
FIG. 16 is a perspective view of the operator support assembly of FIG. 12 with the carriage assembly removed.

Referring now to FIGS. 16 and 17, the mast assembly 930 includes first, second, third and fourth guide track blocks 932A-932D, which are fixedly coupled, such as by welds, to a support plate 960. The support plate 960 is fastened to the truck frame 14 of the truck main body 12 via bolts 960A. The mast assembly 930 further comprises a carriage assembly 934 capable of vertical movement along the track blocks 932A-932D, see FIGS. 12-17. In the illustrated embodiment, the carriage assembly 934 comprises a main body 936 and first, second, third and fourth front load bearings 936A-936D and first and second side load bearings 936E and 936F, see FIG. 15. The front load bearings 936A-936D are received in guide tracks 933A-933D defined in the guide track blocks 932A-932D so as to allow the main body 936 to move vertically along the track blocks 932A-932D and relative to the fixed support plate 960. The first side load bearing 936E is received between opposing center plates 935A and 935B of the guide track blocks 932A and 932B, respectively, see FIG. 16. The second side load bearing 936F is received between opposing center plates 935C and 935D of the guide track blocks 932C and 932D, respectively.

The carriage assembly 934 further comprises a floorboard support 937, which is fixedly coupled, such as by welds, to the main body 936 for movement with the main body 936. The floorboard support 937 is positioned beneath the floorboard 910 and supports the floorboard 910 within the rider compartment 30. The floorboard support 937 functions as the sole support for the floorboard 910; hence, the floorboard 910 is suspended in the rider compartment 30 on the support 937 and moves vertically with the floorboard support 937 and the main body 936. Preferably, the floorboard 910 is fixedly coupled to the support 937.

As illustrated in FIG. 12, the first and second tension springs 940 and 942 are connected to side plates 936G and 936H, respectively, extending from the main body 936. The first and second tension springs 940 and 942 are also connected to a yoke 952 forming part of the spring preload adjusting structure 950. The damper 944 may comprise a damper commercially available from Stabilus (Germany) under the product designation Stab-O-Shoc. From mathematical calculations, it is believed that the damper 944 should have a linear damping rate of 4-10 pounds-second/inch for compression, 10-20 pounds-second/inch for extension, and a stroke length between about 1 inch to about 5 inches and preferably about 2 inches. The damper 944 comprises a piston rod 944A fixedly coupled to the main body 936. A cylinder 944B of the damper 944 is fixedly coupled to a block 962, which, in turn, is fixed to the support plate 960. As noted above, the support plate 960 is fixed to the truck main body frame 14. The cylinder 944B may contain a fluid such as air or oil and a piston (not shown) coupled to the piston rod 944A, wherein the piston may have a small opening through which the fluid flows.

The springs 940 and 942 function to absorb at least a portion of energy resulting from disturbances encountered by the truck 10 as it moves along a floor surface. The springs 940 and 942 extend (for a bump) and retract (for a hole) in response to receiving kinetic energy and, as such, store the kinetic energy as potential energy. The damper 944 functions to absorb the energy released from the springs 940 and 942 as the springs 940 and 942 return to an initial position following extension or retraction, i.e., the damper 944 converts the kinetic energy into heat. The damper 944 further performs a damping function as the springs 940 and 942 are extended or retracted. By absorbing and dissipating the energy resulting from disturbances encountered by the truck 10, the springs 940 and 942 and the damper 944 function to substantially reduce impact and vibration energy from reaching the operator standing on the floorboard 910.

A lever 954, also forming part of the preload adjusting structure 950, is pivotally coupled to the fixed support plate 960 at a pivot connection 954A, see FIG. 16. An adjust-assist spring 956 is coupled to the fixed support plate 960 and a first end 954B of the lever 954. The yoke 952 is pivotally coupled to the lever 954 at a pivot connection 954C. A U-shaped engaging member (not shown) is provided on a surface of the lever 954 facing the fixed support plate 960 at or near a second end 954D of the lever 954 and is capable of engaging one of a plurality of recesses 964A provided in an adjust-setting plate 964 fixed to the support plate 960. An operator is capable of gripping the lever at the lever second end 954D so as to adjust the tension on the springs 940 and 944. The adjust-assist spring 956 applies a force to the lever 954 to help an operator overcome the forces applied to the yoke 952 by the springs 940 and 942. By moving the lever 954 in a direction away from the main body 936, the first and second springs 940 and 942 are extended, i.e., lengthened, so as to increase a preload on each spring 940, 942, see FIG. 13 where the lever 954 is positioned at its uppermost position such that the preload on the springs 940 and 942 is at its greatest value. By moving the lever 954 in a direction toward the main body 936, the preload on the springs 940 and 942 is reduced, see FIG. 12 where the lever 954 is positioned at its lowermost position such that the preload on the springs 940 and 942 is at its lowest value.

An upper stop block 958 with first and second upper stops 958A and 958B is fixedly coupled to the fixed support plate 960 so as to limit upward movement of the carriage assembly 934, see FIGS. 12 and 13. First and second lower stops 959A and 959B are fixed to a top plate 9361 of the main body 936 and are capable of engaging the first and second guide track blocks 932A and 932B so as to limit downward movement of the carriage assembly 934, see FIGS. 14 and 15. The upper and lower stops may be made of natural rubber, urethane, silicone or other like elastomeric type material. The stops in a preferred embodiment provide a force deflection characteristic, i.e., they deflect by x amount when a force F is applied against the stop, as described by the following polynomial equation:

$$F = -27.88x^3 + 251x^2 + 86.7x$$

wherein F=force, and x=deflection.

Preferably, the position of the floorboard 910 is located in a neutral position between an upper stop position where the carriage assembly 934 engages the upper stops 958A and 958B and a lower stop position where the lower stops 959A and 959B engage the first and second track blocks 932A and 932B. In the illustrated embodiment, the "neutral position" is equal to a predefined position falling within a range equal to ±15% of a centered position. That is, the neutral position is a predefined position which may comprise a midway position between the upper and lower stop positions or may be defined by another position falling within the range of ±15% of the midway or centered position. The maximum distance that the floorboard 910 moves between its upper and lower stop positions may be from about 1 inch to about 5 inches and preferably is about 2 inches.

When a light-weight operator is positioned on the floorboard 910, the floorboard 910 may be spaced from the neutral position toward the upper stops 958A and 958B. Conversely, when a heavy-weight operator is positioned on the floorboard 910, the floorboard 910 may be spaced from the neutral position in a direction away from the upper stops 958A and 958B. The operator preferably makes an appropriate adjustment via the lever 954 to vary the preload on the springs 940 and 942 such that the floorboard 910 is positioned in its neutral position when the operator is standing on the floorboard 910. A visual mark (not shown) may be provided on the support plate 960, which, when the floorboard 910 is aligned with the mark, indicates to the operator that the floorboard is in its neutral position.

It is preferred that the operator support assembly 900 have a natural frequency between about 1.5 and about 2.5 Hz. It is further preferred that the floorboard 910 typically move only within a range of positions well within its upper and lower stop positions during normal operation of the truck 10. It is believed that the energy absorbing structure 920 coupled to the floorboard 910 supporting an operator having a weight between about 100 pounds and 300 pounds and capable of achieving these two objectives may comprise first and second springs 940 and 942 having a relaxed length (prior to being coupled to the side plates 936G and 936H and the yoke 952) of from about 8 inches to about 11 inches, and a spring rate of from about 25 pounds/inch to about 200 pounds/inch.

An operator support assembly 1000 constructed in accordance with a tenth embodiment of the present invention is illustrated in FIGS. 18-21, where like reference numerals indicate like elements. The operator support assembly 1000 may be incorporated into a truck similar to the one illustrated in FIG. 1 or other materials handling vehicles. The operator support assembly 1000 comprises a suspended floorboard (not shown, but is substantially the same as the floorboard 910 illustrated in phantom in FIG. 12 and will be referred to hereinafter as floorboard 910), which defines a floor in the truck rider compartment, and an energy absorbing structure 1020. In the illustrated embodiment, the operator support assembly 1000 may comprise a single assembly, which may be assembled as a single unit prior to being mounted to the truck main body frame 14.

The energy absorbing structure 1020 is coupled to the truck main body frame 14 and the suspended floorboard 910 for absorbing and dissipating at least a portion of energy resulting from disturbances encountered by the truck 10 as it moves across a floor surface prior to the energy portion reaching the operator standing on the suspended floorboard 910. The disturbances may result from the truck 10 passing over a continuously uneven surface, or moving over large bumps or sharp drops in the surface. In the embodiment illustrated in FIGS. 18-21, the energy absorbing structure 1020 comprises a mast assembly 930, first and second tension springs 940 and 942, a damper 944, and spring preload adjusting structure 1050. The mast assembly 930, the first and second springs 940 and 940 and the damper 944 are constructed in substantially the same manner as the mast assembly 930, the springs 940 and 942 and the damper 944 of the embodiment of FIGS. 12-17. The mast assembly 930 comprises first, second, third and fourth guide track blocks 932A-932D and carriage assembly 934, see FIGS. 18 and 21. The carriage assembly 934 comprises main body 936, first, second, third and fourth front load bearings 936A-936D, first and second side load bearings 936E and 936F and floorboard support 937, see FIGS. 15 and 18.

The first and second tension springs 940 and 942 are connected to a yoke 1052 forming part of the spring preload adjusting structure 1050 as well as to the main body side plates 936G and 936H, see FIG. 18.

A lever 1054, also forming part of the preload adjusting structure 1050, is pivotally coupled to the fixed support plate 960 at a pivot connection 1054A. An adjust-assist spring 1055 is coupled to the fixed support plate 960 and a first end 1054G of the lever 1054. A motor 1056 is provided having a main body 1056B pivotally coupled to the support plate 960 at a pivot connection 1056C and a threaded screw 1056D which engages a threaded block 1059 pivotally connected to the lever 1054 at a pivot connection 1056E. The yoke 1052 is pivotally coupled to the lever 1054 at a pivot connection 1054F. The motor 1056 is capable of rotating the screw 1056D so as to move the block 1059 toward and away from the motor main body 1056B, which, in turn, causes the lever 1054 to pivot. The lever 1054 is capable of pivoting between a maximum counter-clockwise position, as viewed in FIGS. 18-20, where a second end 1054H of the lever 1054 engages and actuates a first limit switch 1057A, and a maximum clockwise position, as viewed in FIG. 21, where an intermediate portion 10541 of the lever 1054 engages and actuates a second limit switch 1057B. When the lever 1054 is rotated counter-clockwise, the first and second springs 940 and 942 are extended, i.e., lengthened, so as to increase a preload on each spring 940, 942. The adjust-assist spring 1055 applies a force to the lever 1054 in a direction away from the motor 1056 so as to assist the motor 1056 in overcoming the forces applied by the springs 940 and 942 to the yoke 1052 when the motor 1056 is actuated to rotate the lever 1054 counter-clockwise. When the lever 1054 is rotated clockwise, the preload on the first and second springs 940 and 942 is reduced.

When the lever second end 1054H engages the first limit switch 1057A, the preload on the springs 940 and 942 is at its greatest value. When the lever intermediate portion 10541 engages the second limit switch 1057B, the preload on the springs 940 and 942 is at its lowest value. Actuation of either the first limit switch 1057A or the second limit switch 1057B by the lever 1054 deactivates the motor 1056.

Just as in the embodiment illustrated in FIGS. 12-17, an upper stop block 958 with first and second upper stops 958A and 958B is fixedly coupled to the fixed support plate 960 so as to limit upward movement of the carriage assembly 934. Also, just as in the embodiment of FIGS. 12-17, first and second lower stops 959A and 959B are fixed to the top plate 9361 of the main body 936 and are capable of engaging the first and second guide track blocks 932A and 932B so as to limit downward movement of the carriage assembly 934, see FIGS. 15, 18 and 21. The upper and lower stops may be made of natural rubber, urethane, silicone or other like elastomeric type material. The stops in a preferred embodiment provide a force deflection characteristic, i.e., they deflect by x amount when a force F is applied against the stop, as described by the following polynomial equation:

$$F = -27.88x^3 + 251x^2 + 86.7x$$

wherein F=force, and x=deflection.

Preferably, the position of the floorboard 910 is located in a neutral position between an upper stop position where the carriage assembly 934 engages the upper stops 958A and 958B and a lower stop position where the lower stops 959A and 959B engage the first and second track blocks 932A and 932B. In the illustrated embodiment, the "neutral position" is equal to a predefined position falling within a range equal to ±15% of a centered position. That is, the neutral position is a predefined position which may comprise a midway position between the upper and lower stop positions or may be defined by another position falling within the range of ±15% of the midway or centered position. The maximum distance that the floorboard 910 moves between its upper and lower stop positions may be from about 1 inch to about 5 inches and preferably is about 2 inches.

When a light-weight operator is positioned on the floorboard 910, the floorboard 910 may be spaced from the neutral position toward the upper stops 958A and 958B. Conversely, when a heavy-weight operator is positioned on the floorboard 910, the floorboard 910 may be spaced from the neutral position in a direction away from the upper stops 958A and 958B.

It is contemplated that the position of the floorboard 910 may be adjusted automatically during a height adjustment operation or manually. An automatic floorboard height adjustment operation may be effected just after an operator enters the operator's compartment 30 and activates the presence sensor 40. Alternatively, a floorboard height adjustment operation may be effected just after an operator, standing on the floorboard, selects a direction of travel for the truck, i.e., when power is provided to the first and second driven wheels.

For automatic adjustment during a floorboard height adjustment operation, a first sensor 1100 is provided for detecting the position of the carriage assembly 934 and the floorboard 910 relative to a desired neutral position or the support plate 960. The sensor 1100 comprises a potentiometer 1102 coupled to the support plate 960 and a rocker arm 1104 coupled to the potentiometer 1102 and the main body side plate 936G, see FIG. 18. The rocker arm 1104 moves with the carriage assembly main body 936 such that the sensor 1100 senses the position of the carriage assembly 934 and the floorboard 910. In FIG. 18, the carriage assembly 934 is in its uppermost position where it engages upper stops 958A and 058B. In FIG. 19, the carriage assembly 934 is in an intermediate position and in FIG. 20, the carriage assembly 934 is in its lowermost position.

When in the automatic adjust mode, which mode may be selected by an operator via a switch (not shown) or the like provided in the rider compartment 30, the preload on the springs 940 and 942 is automatically varied during a floorboard height adjustment operation so as to position the floorboard 910, with an operator thereon, in the neutral position. The sensor 1100 generates position signals to a controller (not shown) indicative of the location of the floorboard 910 relative to its neutral position. In response to receiving the position signals from the sensor 1100, the controller generates control signals to the motor 1056 causing the motor 1056 to rotate the screw 1056D so as to pivot the lever 1054 in an appropriate direction to vary the preload on the springs 940 and 942 such that the floorboard 910, with the operator standing on it, is returned to the neutral position. Hence, so as to allow the floorboard 910 to be moved to the neutral position during a floorboard height adjustment operation, the motor 1056 is actuated via the controller during the floorboard height adjustment operation in response to position signals generated by the sensor 1100 to vary the preload on the springs 940 and 942 such that the floorboard 910 is repositioned to its neutral position.

In the manual adjust mode, the operator may vary the preload on the springs 940 and 942 via an adjustment knob or switch (not shown) in the rider compartment 30. To give the floorboard 910 a "softer" feel when standing on the floorboard 910, the operator may vary the position of the adjustment knob to cause the motor 1056 to move the lever 1054 in a clockwise direction, as viewed in FIG. 18, so as to reduce the preload on the springs 940 and 942. To give the floorboard 910 a "firmer" feel when standing on the floorboard 910, the operator may vary the position of the adjustment knob so as to cause the motor 1056 to move the lever 1054 in a counterclockwise direction, as viewed in FIG. 18, so as to increase the preload on the springs 940 and 942. Based on the adjustment selected by the operator, the floorboard 910 may or may not be located in its neutral position when the operator is standing on the floorboard 910. In the manual adjust mode, the controller disregards the position signals generated by the first sensor 1100.

A second sensor 1110 may be provided for detecting the position of the lever 1054. The sensor 1110 comprises a potentiometer 1112 coupled to the support plate 960 and a rocker arm 1114 coupled to the potentiometer 1112 and the lever 1054, see FIG. 18. The rocker arm 1114 is rotated by the lever 1054 when the lever 1054 is pivoted by the motor 1056 such that the sensor 1110 senses the position of the lever 1054 and generates lever position signals to the controller. In response to receiving the signals generated by the sensor 1110, the controller determines the position of the lever 1054 and, hence, the preload on the springs 940 and 942. The controller may activate a display (not shown) within the rider compartment 30 so as to indicate to the operator the current preload on the springs 940 and 942, e.g., firm, soft or an intermediate condition between firm and soft. During the automatic mode, the controller may disregard the lever position signals generated by the second sensor 1110. Other position sensing devices may be employed in place of the switches 1057A, 1057B and the sensor 1110. For example, an encoder or potentiometer associated with the motor screw may be employed.

It is preferred that the operator support assembly 1000 have a natural frequency between about 1.5 and about 2.5 Hz. It is further preferred that the floorboard 910 typically move only within a range of positions well within its upper and lower stop positions during normal operation of the truck 10. It is believed that the energy absorbing structure 1020 coupled to the floorboard 910 supporting an operator having a weight between about 100 pounds and 300 pounds and capable of achieving these two objectives may comprise first and second springs 940 and 942 having a relaxed length (prior to being coupled to the side plates 936G and 936H and the yoke 1052) of from about 8 inches to about 11 inches, and a spring rate of from about 25 pounds/inch to about 200 pounds/inch.

One or more electromagnets (not shown) may be mounted to the support plate 960 and positioned adjacent the carriage assembly main body 936. When power is provided to the electromagnets, the electromagnets function to releasably lock the carriage assembly main body 936 and, hence, the floorboard 910, to the support plate 960 and the truck frame 14. The electromagnets may be activated to lock the floorboard 910 to the support plate 960 so as to provide an operator with a firm feel as the operator steps into or out of the rider compartment. It is also contemplated that the one or more electromagnets may be replaced with a solenoid having a reciprocating piston. The solenoid is fixed to the support plate 960. A bore is provided in the carriage assembly main body 936 to receive the solenoid piston when the solenoid is actuated to extend the piston. To lock the floorboard 910 to the support plate 960, the solenoid is actuated to extend the piston such that it engages the bore in the carriage main body 936. Once an operator has entered the rider compartment 30, and power is provided to the driven wheels, the solenoid may be actuated to retract the piston such that it exits the bore in the carriage assembly main body 936 so as to allow the carriage assembly 934 to move relative to the support plate 960.

Figure 22:
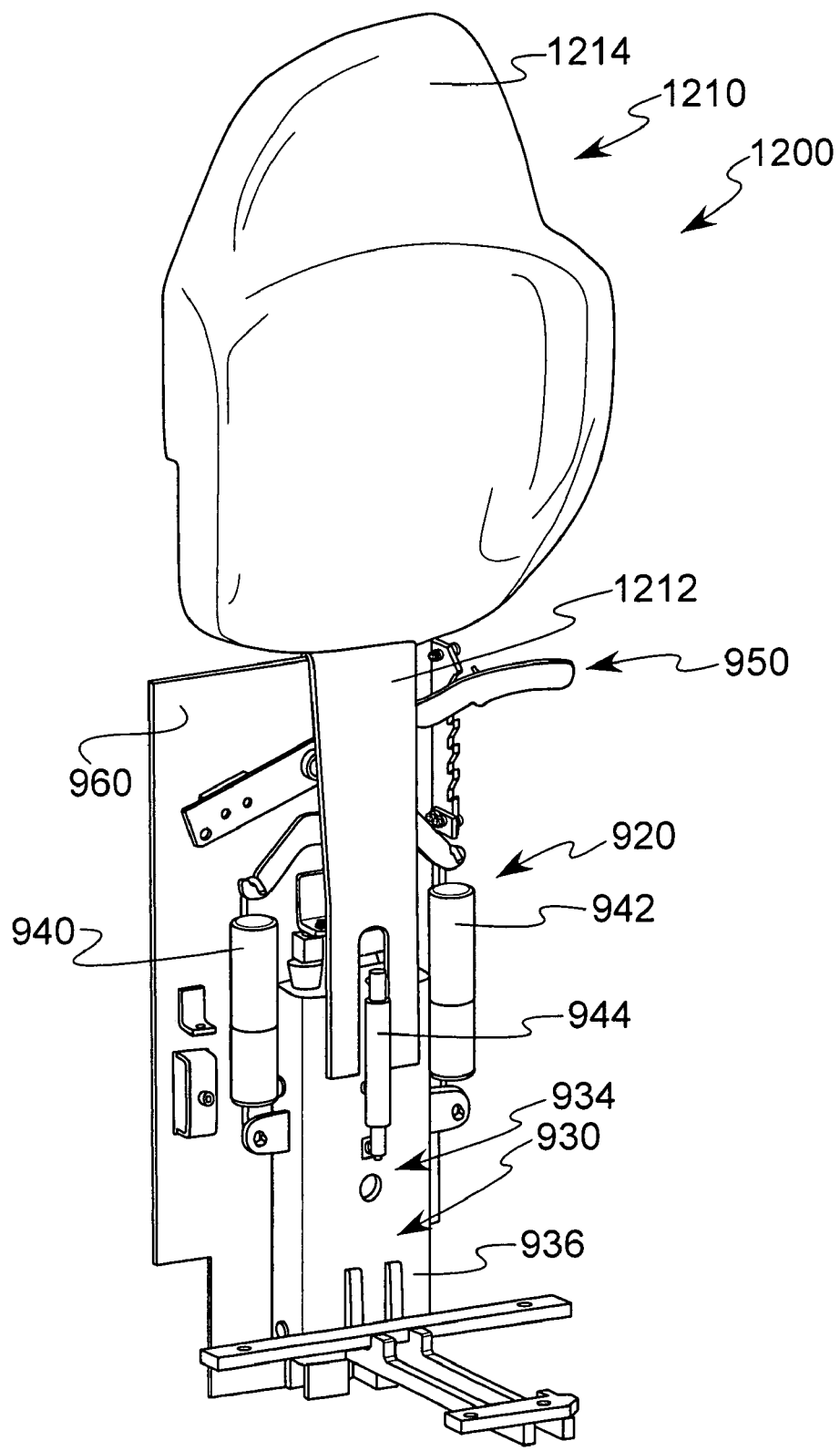
FIG. 22 is a perspective view of an operator support assembly constructed in accordance with an eleventh embodiment of the present invention.

An operator support assembly 1200 constructed in accordance with an eleventh embodiment of the present invention is illustrated in FIG. 22, where like reference numerals indicate like elements. The operator support assembly 1200 may be incorporated into a truck similar to the one illustrated in FIG. 1 or other materials handling vehicles. The operator support assembly 1200 is constructed in substantially the same manner as operator support assembly 900 illustrated in FIGS. 12-17, but, in addition, a backrest assembly 1210 is provided. The backrest assembly 1210 comprises a support 1212 and a pad 1214 coupled to the support 1212. The support 1212 is fixedly coupled to the main body 936 of the carriage assembly 934 so as to move with the carriage assembly 934. Hence, as the carriage assembly 934 moves upward and downward as a truck in which the assembly 1200 is incorporated encounters bumps and holes, the backrest assembly 1210 moves with the floorboard (not shown in FIG. 22) coupled to the carriage assembly 934 and the operator. It is also contemplated that an armrest, a control knob or lever such as a multifunction controller or steering tiller or other elements typically found within an operator's compartment may be fixedly coupled to the carriage assembly 934 so that they move with the carriage assembly 934 and the floorboard.

Many alterations and modifications may be made by those having ordinary skill in the art without departing from the spirit and scope of the invention. Therefore, it must be understood that the illustrated embodiments have been set forth only for the purposes of example and that they should not be taken as limiting the invention as defined by the following claims. For example, the mast assembly 130 may comprise two or more channels 132A fixedly coupled to the frame 14 of the truck main body 12, and two or more corresponding carriage assemblies 134A capable of vertical movement within the channels 132A.

The definitions of the words or elements of the following claims shall include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim.

Insubstantial changes from the claimed subject matter as viewed by a person with ordinary skill in the art, now known or later devised, are expressly contemplated as being equivalently within the scope of the claims.

The claims are thus to be understood to include what is specifically illustrated and described above, what is conceptually equivalent, what can be obviously substituted and also what essentially incorporates the essential idea of the invention.

What is claimed is:

1. A materials handling vehicle comprising:
   a frame;
   a set of wheels supported on said frame to allow said materials handling vehicle to move across a floor surface; and
   an operator support assembly comprising a suspended floorboard upon which an operator may stand and an energy absorbing structure coupled to said frame and said suspended floorboard for absorbing and dissipating at least a portion of energy resulting from disturbances encountered by the vehicle as it moves across the floor surface prior to said energy portion reaching the operator standing on said suspended floorboard, said energy absorbing structure including a damping element for effecting a damping function, said damping element comprising at least one damper, said energy absorbing structure further comprising at least one spring for receiving and storing energy, a mast assembly coupled to said frame and said floorboard for permitting movement of said suspended floorboard relative to said frame and structure coupled between said frame and said at least one spring for varying a preload on said at least one spring, said structure coupled between said frame and said at least one spring comprising a lever capable of being manually moved by an operator.

2. A materials handling vehicle as set forth in claim 1, further comprising structure for releasably locking said floorboard to said frame when an operator enters or exits a rider compartment in which said operator assembly is located.

3. A materials handling vehicle as set forth in claim 1, wherein said operator support assembly further comprises a backrest assembly coupled to said suspended floorboard so as to move with said suspended floorboard.

4. A materials handling vehicle as set forth in claim 1, wherein said damping element comprises at least one damper at least partially filled with a liquid.

* * * * *

UNITED STATES PATENT AND TRADEMARK OFFICE
CERTIFICATE OF CORRECTION

| | | |
|---|---|---|
| PATENT NO. | : 7,497,505 B2 | Page 1 of 1 |
| APPLICATION NO. | : 11/264851 | |
| DATED | : March 3, 2009 | |
| INVENTOR(S) | : Lewis H. Manci et al. | |

It is certified that error appears in the above-identified patent and that said Letters Patent is hereby corrected as shown below:

Title page, item (75) "William C. Jones, Jr." should be deleted from the list of inventors as stated in the Office Communication of January 28, 2009;

Col. 28, line 16, "a top plate 9361 of the main" should read --a top plate 936I of the main--;

Col. 29, line 64, "portion 10541 of the lever 1054" should read --portion 1054I of the lever 1054--;

Col. 30, line 10, "When the lever intermediate portion 10541" should read --When the lever immediate portion 1054I--;

Col. 30, line 21, "9361 of the main body 936" should read --936I of the main body 936--.

Signed and Sealed this

Twenty-fifth Day of May, 2010

David J. Kappos
*Director of the United States Patent and Trademark Office*